United States Patent
Kwon et al.

(10) Patent No.: US 10,313,749 B2
(45) Date of Patent: *Jun. 4, 2019

(54) APPARATUS FOR BROADCASTING SCALABLE VIDEO CONTENTS AND METHOD USING THE SAME

(71) Applicant: ELECTRONICS AND TELECOMMUNICATIONS RESEARCH INSTITUTE, Daejeon (KR)

(72) Inventors: Sun-Hyoung Kwon, Daejeon (KR); Sung-Ik Park, Daejeon (KR); Jae-Young Lee, Daejeon (KR); Heung-Mook Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 114 days.

This patent is subject to a terminal disclaimer.

(21) Appl. No.: 14/994,647

(22) Filed: Jan. 13, 2016

(65) Prior Publication Data

US 2016/0212458 A1 Jul. 21, 2016

(30) Foreign Application Priority Data

Jan. 15, 2015 (KR) .......................... 10-2015-0007229
Dec. 30, 2015 (KR) .......................... 10-2015-0189638

(51) Int. Cl.
*H04N 21/4402* (2011.01)
*H04N 21/2343* (2011.01)
*H04J 99/00* (2009.01)
*H04N 21/845* (2011.01)

(52) U.S. Cl.
CPC ..... *H04N 21/440227* (2013.01); *H04J 15/00* (2013.01); *H04N 21/234327* (2013.01); *H04N 21/8451* (2013.01)

(58) Field of Classification Search
None
See application file for complete search history.

(56) References Cited

U.S. PATENT DOCUMENTS

| 6,798,838 B1* | 9/2004 | Ngo | H04L 1/0003 375/240.19 |
|---|---|---|---|
| 2006/0282737 A1* | 12/2006 | Shi | H03M 13/2966 714/746 |
| 2010/0046675 A1* | 2/2010 | Collins | H04L 1/0041 375/340 |
| 2010/0232340 A1* | 9/2010 | Godor | H04H 20/57 370/312 |

(Continued)

*Primary Examiner* — Ricky Chin

(57) ABSTRACT

An apparatus and method for broadcasting scalable video contents are disclosed. An apparatus for broadcasting scalable video contents according to an embodiment of the present invention includes a video codec unit configured to generate a plurality of codec layer signals by dividing codec media stream into a plurality of layers; encapsulation and delivery unit configured to perform a transformation for transferring on the codec layer signals; and broadcasting signal multiplexing unit configured to generate a layered-division-multiplexed broadcasting signal by combining the codec layer signals at different power levels.

14 Claims, 18 Drawing Sheets

(56) References Cited

U.S. PATENT DOCUMENTS

| | | | |
|---|---|---|---|
| 2011/0194645 A1* | 8/2011 | Kim | H04L 27/3488 375/295 |
| 2011/0305144 A1* | 12/2011 | Sethakaset | H04B 7/15592 370/246 |
| 2013/0291046 A1* | 10/2013 | Ko | H04N 21/84 725/116 |
| 2016/0119807 A1* | 4/2016 | Sun | H04W 24/10 370/252 |
| 2016/0218823 A1* | 7/2016 | Baek | H04L 1/0041 |
| 2017/0012811 A1* | 1/2017 | Park | H04L 1/0061 |
| 2017/0019207 A1* | 1/2017 | Park | H04L 1/0003 |
| 2017/0026223 A1* | 1/2017 | Park | H04J 11/004 |
| 2017/0094480 A1* | 3/2017 | Kwon | H04J 11/00 |
| 2017/0180080 A1* | 6/2017 | Shin | H04L 1/0071 |

* cited by examiner

APPARATUS FOR BROADCASTING SCALABLE VIDEO CONTENTS AND METHOD USING THE SAME

CROSS REFERENCE TO RELATED APPLICATION

This application claims the benefit of Korean Patent Application Nos. 10-2015-0007229 and 10-2015-0189638, filed Jan. 15, 2015 and Dec. 30, 2015, which are hereby incorporated by reference in their entirety into this application.

BACKGROUND OF THE INVENTION

1. Technical Field

The present invention relates to broadcast signal transmission/reception technology that is used in a broadcasting system and, more particularly, to a broadcast signal transmission/reception system that efficiently multiplexes layer signals of scalable video contents and then broadcasts the multiplexed signal.

2. Description of the Related Art

To support multiple services at the same time, multiplexing, i.e., the process of mixing a plurality of signals, is required. Of multiplexing techniques, currently widely used techniques include Time Division Multiplexing (TDM) adapted to divide and use time resources and Frequency Division Multiplexing (FDM) adapted to divide and use frequency resources. That is, TDM is a method of assigning time segments to respective services, and FDM is a technique for assigning frequency resource segments to respective services and then using them. Recently, there is an urgent need for new multiplexing technology that is applicable to a next generation broadcasting system and provides greater flexibility and performance than TDM and FDM.

Moreover, the researches about video codec technologies for providing scalability such as Scalable Video Coding (SVC) or Scalable-HEVC Video Coding (SHVC) are actively being performed.

SUMMARY OF THE INVENTION

An object of the present invention is to provide a more flexible and advanced broadcasting service by efficiently multiplexing scalable video contents using scalable video codecs such as SVC (Scalable Video Coding) or SHVC (Scalable-HEVC Video Coding) to users Furthermore, an object of the present invention is to provide high level flexibilities and excellent performances by combining scalable video codecs such as SVC or HEVC and transferring/receiving technologies based on Layered Division Multiplexing (LDM) for next generation broadcasting system.

In order to accomplish the above objects, the present invention provides an apparatus for broadcasting signal multiplexing apparatus, including: a video codec unit configured to generate a plurality of codec layer signals by dividing codec media stream into a plurality of layers; encapsulation and delivery unit configured to perform a transformation for transferring on the codec layer signals; and broadcasting signal multiplexing unit configured to generate a layered-division-multiplexed broadcasting signal by combining the codec layer signals at different power levels.

In this case, the codec layer signals may be one-to-one mapped into layers of the broadcasting signal multiplexing unit.

In this case, the codec layer signals may include a base layer signal and an enhancement layer signal, and the base layer signal may correspond to a core layer signal of the broadcasting signal multiplexing unit and the enhancement layer signal may correspond to an enhanced layer signal of the broadcasting signal multiplexing unit.

In this case, the broadcasting signal multiplexing unit may comprise: a combiner configured to generate a multiplexed signal by combining the core layer signal and the enhanced layer signal at different power levels; a power normalizer configured to reduce power of the multiplexed signal to a power level corresponding to the core layer signal; a time interleaver configured to generate a time-interleaved signal by performing interleaving that is applied to both the core layer signal and the enhanced layer signal; and a frame builder configured to generate a broadcast signal frame corresponding to the layered-division-multiplexed broadcasting signal using the time-interleaved signal and L1 signaling information.

In this case, the broadcasting signal multiplexing unit may further comprise an injection level controller configured to generate a power-reduced enhanced layer signal by reducing power of the enhanced layer signal; and the combiner may generate the multiplexed signal by combining the core layer signal and the power-reduced enhanced layer signal.

In this case, the broadcasting signal multiplexing unit may further comprise: a core layer Bit-Interleaved Coded Modulation (BICM) unit configured to correspond to the core layer signal; and an enhanced layer BICM unit configured to perform Bit-Interleaved Coded Modulation (BICM) encoding different from that of the core layer BICM unit.

In this case, the power normalizer may correspond to a normalizing factor and reduce the power of the multiplexed signal by a level by which the power has been increased by the combiner.

In this case, the injection level controller may correspond to a scaling factor. In this case, each of the normalizing factor and the scaling factor may be a value that is larger than 0 and smaller than 1, the scaling factor may decrease as a reduction in power corresponding to the injection level controller becomes larger, and the normalizing factor may increase as a reduction in power corresponding to the injection level controller becomes larger.

In this case, the enhanced layer signal may correspond to enhanced layer data that is restored based on cancellation corresponding to the restoration of core layer data corresponding to the core layer signal.

In this case, the combiner may combine one or more extension layer signals, having lower power levels than the core layer signal and the enhanced layer signal, with the core layer signal and the enhanced layer signal.

In this case, the codec layer signals may further include an additional enhancement layer signal, and the additional enhancement layer signal may correspond to the extension layer signal.

In this case, the codec layer signals may include a base layer signal and enhancement layer signals, and the base layer signal may correspond to a core layer signal of the broadcasting signal multiplexing unit and the enhancement layer signals may correspond to an enhanced layer signal of the broadcasting signal multiplexing unit.

In this case, the enhancement layer signals may be multiplexed by using a multiplexer in the broadcasting signal multiplexing unit to be mapped into the enhanced layer signal.

Furthermore, an embodiment of the present invention provides a method of broadcasting scalable video contents, including: generating a plurality of codec layer signals by dividing codec media stream into a plurality of layers; performing a transformation for transferring on the codec layer signals; and generating a layered-division-multiplexed broadcasting signal by combining the codec layer signals at different power levels.

In this case, the codec layer signals may be one-to-one mapped into layers of a layered-division-multiplexing corresponding to the layered-division-multiplexed broadcasting signal.

In this case, the codec layer signals may include a base layer signal and an enhancement layer signal, and the base layer signal may correspond to a core layer signal of the layered-division-multiplexing and the enhancement layer signal may correspond to an enhanced layer signal of the layered-division-multiplexing.

In this case, the generating the layered-division-multiplexed broadcasting signal may comprises: generating a multiplexed signal by combining the core layer signal and the enhanced layer signal at different power levels; reducing power of the multiplexed signal to a power level corresponding to the core layer signal; generating a time-interleaved signal by performing interleaving that is applied to both the core layer signal and the enhanced layer signal; and generating a broadcast signal frame corresponding to the layered-division-multiplexed broadcasting signal using the time-interleaved signal and L1 signaling information.

In this case, the generating the multiplexed signal may comprise combining one or more extension layer signals, having lower power levels than the core layer signal and the enhanced layer signal, with the core layer signal and the enhanced layer signal.

In this case, the codec layer signals may further include an additional enhancement layer signal, and the additional enhancement layer signal may correspond to the extension layer signal.

In this case, the codec layer signals may include a base layer signal and enhancement layer signals, and the base layer signal may correspond to a core layer signal of a layered-division-multiplexing and the enhancement layer signals may correspond to an enhanced layer signal of the layered-division-multiplexing.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
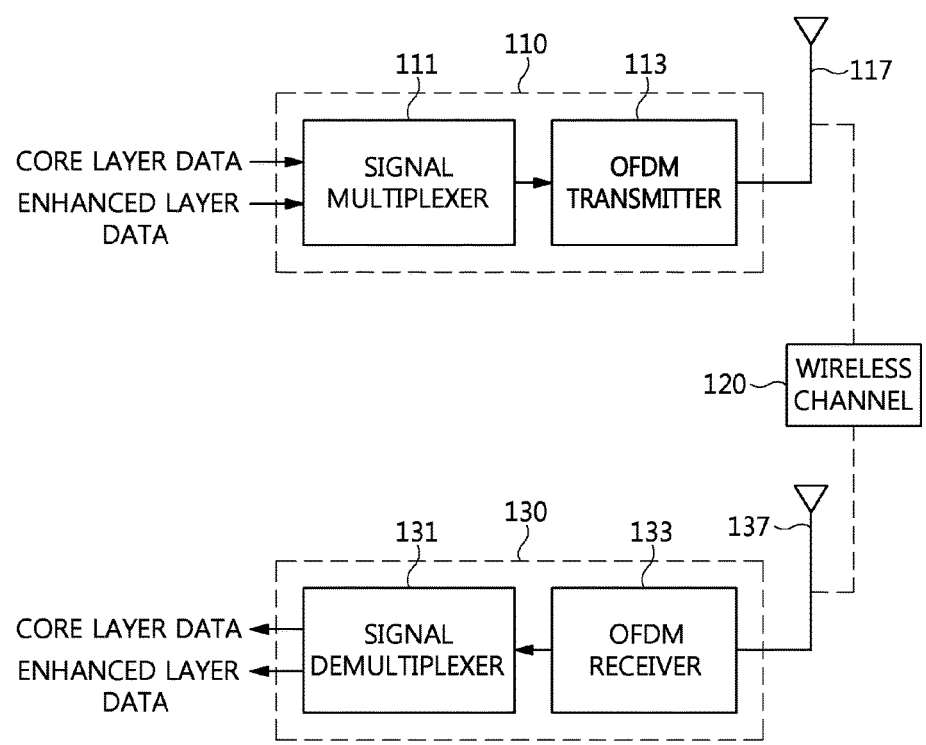
FIG. 1 is a block diagram showing a broadcast signal transmission/reception system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment according to the present invention will be described in detail with reference to the accompanying drawings.

FIG. 1 is a block diagram showing a broadcast signal transmission/reception system according to an embodiment of the present invention.

Referring to FIG. 1, a broadcast signal transmission/reception system according to the embodiment of the present invention includes a broadcast signal transmission apparatus 110, a wireless channel 120, and a broadcast signal reception apparatus 130.

The broadcast signal transmission apparatus 110 includes a signal multiplexer 111 for multiplexing core layer data and enhanced layer data, and an OFDM transmitter 113.

The signal multiplexer 111 combines a core layer signal corresponding to core layer data and an enhanced layer signal corresponding to enhanced layer data at different power levels, and generates a multiplexed signal by performing interleaving that is applied to both the core layer signal and the enhanced layer signal. In this case, the signal multiplexer 111 may generate a broadcast signal frame using a time-interleaved signal and L1 signaling information. In this case, the broadcast signal frame may be an ATSC 3.0 frame.

The OFDM transmitter 113 transmits the multiplexed signal using an OFDM communication method via an antenna 117, thereby allowing the transmitted OFDM signal to be received via the antenna 137 of the broadcast signal reception apparatus 130 over the wireless channel 120.

The broadcast signal reception apparatus 130 includes an OFDM receiver 133 and a signal demultiplexer 131. When the signal transmitted over the wireless channel 120 is received via the antenna 137, the OFDM receiver 133 receives an OFDM signal via synchronization, channel estimation and equalization.

The signal demultiplexer 131 restores the core layer data from the signal received via the OFDM receiver 133 first, and then restores the enhanced layer data via cancellation corresponding to the restored core layer data. In this case, the signal demultiplexer 131 may generate a broadcast signal frame first, may restore L1 signaling information from the broadcast signal frame, and may use the L1 signaling information for the restoration of a data signal. In this case, the L1 signaling information may include injection level information, normalizing factor information, etc.

As will be described in detail later, the signal multiplexer 111 shown in FIG. 1 may include a combiner configured to generate a multiplexed signal by combining a core layer signal and an enhanced layer signal at different power levels; a power normalizer configured to reduce the power of the multiplexed signal to a power level corresponding to the core layer signal; a time interleaver configured to generate a time-interleaved signal by performing interleaving that is applied to both the core layer signal and the enhanced layer signal; and a frame builder configured to generate a broadcast signal frame using the time-interleaved signal and L1 signaling information. In this case, the broadcast signal transmission apparatus 110 shown in FIG. 1 may be viewed as including: a combiner configured to generate a multiplexed signal by combining a core layer signal and an enhanced layer signal at different power levels; a power normalizer configured to reduce the power of the multiplexed signal to a power level corresponding to the core layer signal; a time interleaver configured to generate a time-interleaved signal by performing interleaving that is applied to both the core layer signal and the enhanced layer signal; a frame builder configured to generate a broadcast signal frame using the time-interleaved signal and L1 signaling information; and an OFDM transmitter configured to transmit the broadcast signal frame through an antenna using OFDM communication scheme.

As will be described in detail later, the signal demultiplexer shown in FIG. 1 may include a time deinterleaver configured to generate a time-deinterleaved signal by applying time deinterleaving to a received signal; a de-normalizer configured to increase the power of the received signal or the time-deinterleaved signal by a level corresponding to a reduction in power by the power normalizer of the transmitter; a core layer BICM decoder configured to restore core layer data from the signal power-adjusted by the de-normalizer; an enhanced layer symbol extractor configured to extract an enhanced layer signal by performing cancellation corresponding to the core layer data on the signal power-adjusted by the de-normalizer using the output signal of the core layer FEC decoder of the core layer BICM decoder; a de-injection level controller configured to increase the power of the enhanced layer signal by a level corresponding to a reduction in power by the injection level controller of the transmitter; and an enhanced layer BICM decoder configured to restore enhanced layer data using the output signal of the de-injection level controller. In this case, the broadcast signal reception apparatus 130 shown in FIG. 1 may be viewed as including: an OFDM receiver configured to generate a received signal by performing any one or more of synchronization, channel estimation and equalization on a transmitted signal; a time deinterleaver configured to generate a time-deinterleaved signal by applying time deinterleaving to the received signal; a de-normalizer configured to increase the power of the received signal or the time-deinterleaved signal by a level corresponding to a reduction in power by the power normalizer of the transmitter; a core layer BICM decoder configured to restore core layer data from the signal power-adjusted by the de-normalizer; an enhanced layer symbol extractor configured to extract an enhanced layer signal by performing cancellation corresponding to the core layer data on the signal power-adjusted by the de-normalizer using the output signal of the core layer FEC decoder of the core layer BICM decoder; a de-injection level controller configured to increase the power of the enhanced layer signal by a level corresponding to a reduction in power by the injection level controller of the transmitter; and an enhanced layer BICM decoder configured to restore enhanced layer data using the output signal of the de-injection level controller.

Although not explicitly shown in FIG. 1, a broadcast signal transmission/reception system according to an embodiment of the present invention may multiplex/demultiplex one or more pieces of extension layer data in addition to the core layer data and the enhanced layer data. In this case, the extension layer data may be multiplexed at a power level lower than that of the core layer data and the enhanced layer data. Furthermore, when two or more extension layers are included, the injection power level of a second extension layer may be lower than the injection power level of a first extension layer, and the injection power level of a third extension layer may be lower than the injection power level of the second extension layer.

Figure 2:
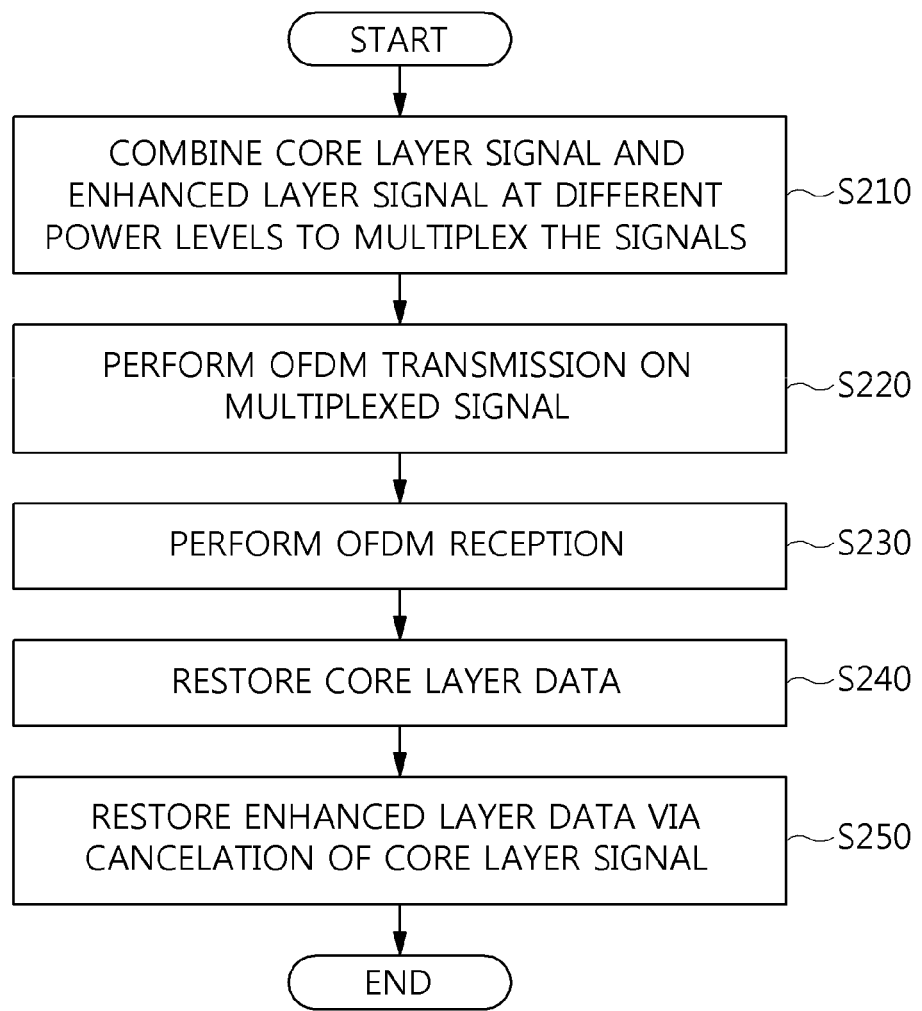
FIG. 2 is an operation flowchart showing a broadcast signal transmission/reception method according to an embodiment of the present invention.

FIG. 2 is an operation flowchart showing a broadcast signal transmission/reception method according to an embodiment of the present invention.

Referring to FIG. 2, in the broadcast signal transmission/reception method according to the embodiment of the present invention, a core layer signal and an enhanced layer signal are combined at different power levels and then multiplexed at step S210.

In this case, the multiplexed signal generated at step S210 may include a data signal and L1 signaling information. In this case, the L1 signaling information may include injection level information and normalizing factor information.

Furthermore, in the broadcast signal transmission/reception method according to the embodiment of the present invention, the multiplexed signal is OFDM transmitted at step S220.

Furthermore, in the broadcast signal transmission/reception method according to the embodiment of the present invention, the transmitted signal is OFDM received at step S230.

In this case, at step S230, synchronization, channel estimation and equalization may be performed.

Furthermore, in the broadcast signal transmission/reception method according to the embodiment of the present invention, core layer data is restored from the received signal at step S240.

Furthermore, in the broadcast signal transmission/reception method according to the embodiment of the present invention, enhanced layer data is restored via the cancellation of the core layer signal at step S250.

In particular, steps S240 and S250 shown in FIG. 2 may correspond to demultiplexing operations corresponding to step S210.

As will be described in detail later, step S210 shown in FIG. 2 may include generating a multiplexed signal by combining a core layer signal and an enhanced layer signal at different power levels; reducing the power of the multiplexed signal to a power level corresponding to the core layer signal; generating a time-interleaved signal by performing interleaving that is applied to both the core layer signal and the enhanced layer signal; and generating a broadcast signal frame using the time-interleaved signal and L1 signaling information.

In this case, the broadcast signal transmission method of step S210 may be viewed as including generating a multiplexed signal by combining a core layer signal and an enhanced layer signal at different power levels; reducing the power of the multiplexed signal to a power level corresponding to the core layer signal; generating a time-interleaved signal by performing interleaving that is applied to both the core layer signal and the enhanced layer signal; generating a broadcast signal frame using the time-interleaved signal and L1 signaling information; and transmitting the broadcast signal frame through an antenna using an OFDM communication scheme.

As will be described in detail later, steps S240 and S250 shown in FIG. 2 may include generating a time-deinterleaved signal by applying time deinterleaving to a received signal; increasing the power of the received signal or the time-deinterleaved signal by a level corresponding to a reduction in power by the power normalizer of the transmitter; restoring core layer data from the power-adjusted signal; extracting an enhanced layer signal by performing cancellation corresponding to the core layer data on the power-adjusted signal; increasing the power of the enhanced layer signal by a level corresponding to a reduction in power by the injection level controller of the transmitter; and restoring enhanced layer data using the power-adjusted enhanced signal. In this case, a broadcast signal reception method according to an embodiment of the present invention may be viewed as including: generating a received signal by performing any one or more of synchronization, channel estimation and equalization on a transmitted signal; generating a time-deinterleaved signal by applying time deinterleaving to the received signal; increasing the power of the received signal or the time-deinterleaved signal by a level corresponding to a reduction in power by the power normalizer of the transmitter; restoring core layer data from the power-adjusted signal; extracting an enhanced layer signal by performing cancellation corresponding to the core layer data on the power-adjusted signal; increasing the power of the enhanced layer signal by a level corresponding to a reduction in power by the injection level controller of the transmitter; and restoring enhanced layer data using the power-adjusted enhanced layer signal.

Figure 3:
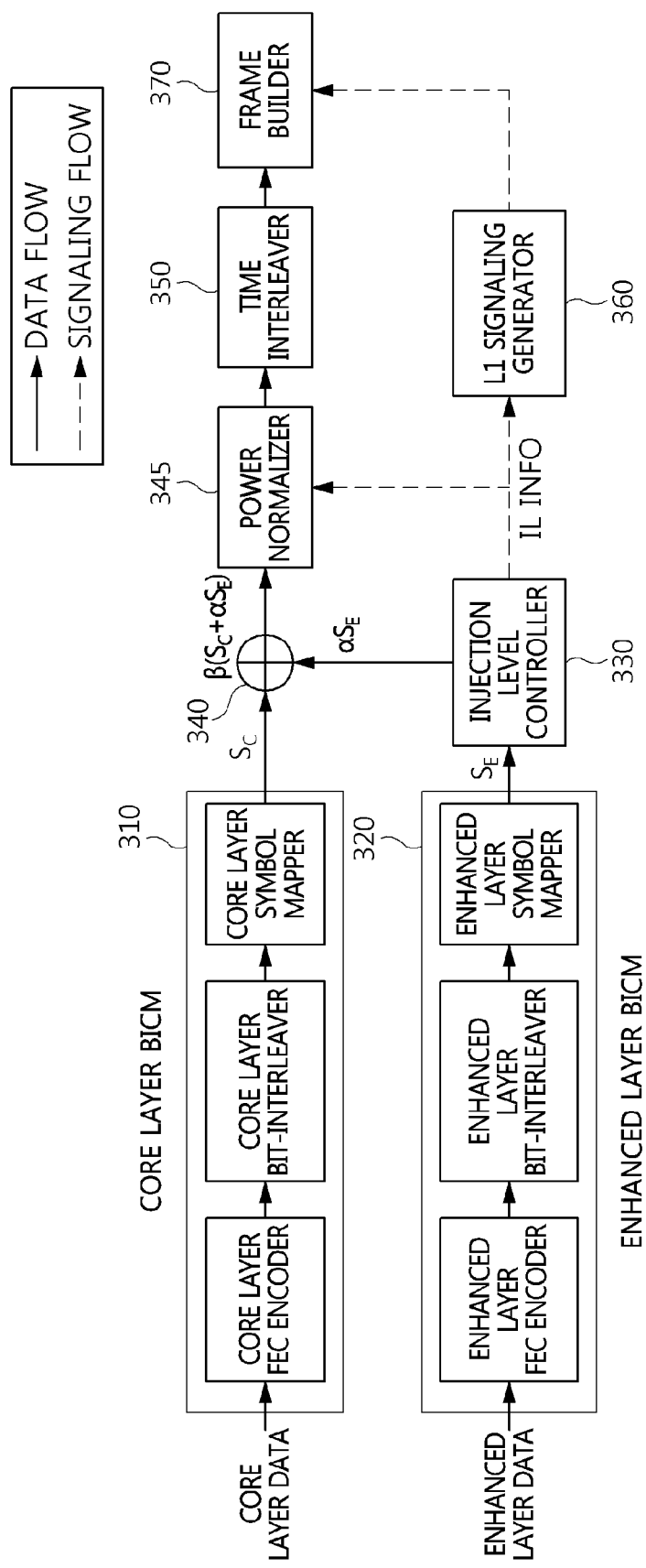
FIG. 3 is a block diagram showing an example of the signal multiplexer shown in FIG. 1.

FIG. 3 is a block diagram showing an example of the signal multiplexer shown in FIG. 1.

Referring to FIG. 3, a signal multiplexer according to an embodiment of the present invention may include a core layer BICM unit 310, an enhanced layer BICM unit 320, an injection level controller 330, a combiner 340, a power normalizer 345, and a time interleaver 350, an L1 signaling generation unit 360, and a frame builder 370.

Generally, a BICM device includes an error correction encoder, a bit interleaver, and a symbol mapper. Each of the core layer BICM unit 310 and the enhanced layer BICM unit 320 shown in FIG. 3 may include an error correction encoder, a bit interleaver, and a symbol mapper. In particular, each of the error correction encoders (the core layer FEC encoder, and the enhanced layer FEC encoder) shown in FIG. 3 may be formed by connecting a BCH encoder and an LDPC encoder in series. In this case, the input of the error correction encoder is input to the BCH encoder, the output of the BCH encoder is input to the LDPC encoder, and the output of the LDPC encoder may be the output of the error correction encoder.

As shown in FIG. 3, core layer data and enhanced layer data pass through respective different BICM units, and are then combined by the combiner 340. That is, the term "Layered Division Multiplexing (LDM)" used herein may refer to combining the pieces of data of a plurality of layers into a single piece of data using differences in power and then transmitting the combined data.

That is, the core layer data passes through the core layer BICM unit 310, the enhanced layer data passes through the enhanced layer BICM unit 320 and then the injection level controller 330, and the core layer data and the enhanced layer data are combined by the combiner 340. In this case, the enhanced layer BICM unit 320 may perform BICM encoding different from that of the core layer BICM unit 310. That is, the enhanced layer BICM unit 320 may perform higher bit rate error correction encoding or symbol mapping than the core layer BICM unit 310. Furthermore, the enhanced layer BICM unit 320 may perform less robust error correction encoding or symbol mapping than the core layer BICM unit 310.

For example, the core layer error correction encoder may exhibit a lower code rate than the enhanced layer error correction encoder. In this case, the enhanced layer symbol mapper may be less robust than the core layer symbol mapper.

The combiner 340 may be viewed as functioning to combine the core layer signal and the enhanced layer signal at different power levels. In an embodiment, power level adjustment may be performed on the core layer signal rather than the enhanced layer signal. In this case, the power of the core layer signal may be adjusted to be higher than the power of the enhanced layer signal.

The core layer data may use forward error correction (FEC) code having a low code rate in order to perform robust reception, while the enhanced layer data may use FEC code having a high code rate in order to achieve a high data transmission rate.

That is, the core layer data may have a broader coverage than the enhanced layer data in the same reception environment.

The enhanced layer data having passed through the enhanced layer BICM unit 320 is adjusted in gain (or power) by the injection level controller 330, and is combined with the core layer data by the combiner 340.

That is, the injection level controller 330 generates a power-reduced enhanced layer signal by reducing the power of the enhanced layer signal. In this case, the magnitude of the signal adjusted by the injection level controller 330 may be determined based on an injection level. In this case, an injection level in the case where signal B is inserted into signal A may be defined by Equation 1 below:

$$\text{Injection level(dB)} = -10 \log_{10}\left(\frac{\text{Signal power of } B}{\text{Signal power of } A}\right) \quad (1)$$

For example, assuming that the injection level is 3 dB when the enhanced layer signal is inserted into the core layer signal, Equation 1 means that the enhanced layer signal has power corresponding to half of the power of the core layer signal.

In this case, the injection level controller 330 may adjust the power level of the enhanced layer signal from 3.0 dB to 10.0 dB in steps of 0.5 dB.

In general, transmission power that is assigned to the core layer is higher than transmission power that is assigned to the enhanced layer, which enables the receiver to decode core layer data first.

In this case, the combiner 340 may be viewed as generating a multiplexed signal by combining the core layer signal with the power-reduced enhanced layer signal.

The signal obtained by the combination of the combiner 340 is provided to the power normalizer 345 so that the power of the signal can be reduced by a power level corresponding to an increase in power caused by the combination of the core layer signal and the enhanced layer signal, and then power adjustment is performed. That is, the power normalizer 345 reduces the power of the signal, obtained by the multiplexing of the combiner 340, to a power level corresponding to the core layer signal. Since the level of the combined signal is higher than the level of one layer signal, the power normalizing of the power normalizer 345 is required in order to prevent amplitude clipping, etc. in the remaining portion of a broadcast signal transmission/reception system.

In this case, the power normalizer 345 may adjust the magnitude of the combined signal to an appropriate value by multiplying the magnitude of the combined signal by the normalizing factor of Equation 2 below. Injection level information used to calculate Equation 2 below may be transferred to the power normalizer 345 via a signaling flow:

$$\text{Normalizing factor} = (\sqrt{(1+10^{-Injection level(dB)/10})})^{-1} \quad (2)$$

Assuming that the power levels of the core layer signal and the enhanced layer signal are normalized to 1 when an enhanced layer signal $S_E$ is injected into a core layer signal $S_C$ at a preset injection level, a combined signal may be expressed by $S_C + \alpha S_E$.

In this case, $\alpha$ is scaling factors corresponding to various injection levels. That is, the injection level controller 330 may correspond to the scaling factor.

For example, when the injection level of an enhanced layer is 3 dB, a combined signal may be expressed by $$S_C + \sqrt{\frac{1}{2}} S_E.$$

Since the power of a combined signal (a multiplexed signal) increases compared to a core layer signal, the power normalizer 345 needs to mitigate the increase in power.

The output of the power normalizer 345 may be expressed by $\beta(S_C + \alpha S_E)$.

In this case, $\beta$ is normalizing factors based on various injection levels of the enhanced layer.

When the injection level of the enhanced layer is 3 dB, the power of the combined signal is increased by 50% compared to that of the core layer signal. Accordingly, the output of the power normalizer 345 may be expressed by $$\sqrt{\frac{2}{3}}\left(S_C + \sqrt{\frac{1}{2}} S_E\right).$$

Table 1 below lists scaling factors $\alpha$ and normalizing factors $\beta$ for various injection levels (CL: Core Layer, EL: Enhanced Layer). The relationships among the injection level, the scaling factor $\alpha$ and the normalizing factor $\beta$ may be defined by Equation 3 below:

$$\begin{cases} \alpha = 10^{\left(\frac{-Injection\ level}{20}\right)} \\ \beta = \dfrac{1}{\sqrt{1+\alpha^2}} \end{cases} \quad (3)$$

TABLE 1

| EL Injection level relative to CL | Scaling factor α | Normalizing factor β |
|---|---|---|
| 3.0 dB | 0.7079458 | 0.8161736 |
| 3.5 dB | 0.6683439 | 0.8314061 |
| 4.0 dB | 0.6309573 | 0.8457262 |
| 4.5 dB | 0.5956621 | 0.8591327 |
| 5.0 dB | 0.5623413 | 0.8716346 |
| 5.5 dB | 0.5308844 | 0.8832495 |
| 6.0 dB | 0.5011872 | 0.8940022 |
| 6.5 dB | 0.4731513 | 0.9039241 |
| 7.0 dB | 0.4466836 | 0.9130512 |
| 7.5 dB | 0.4216965 | 0.9214231 |
| 8.0 dB | 0.3981072 | 0.9290819 |
| 8.5 dB | 0.3758374 | 0.9360712 |
| 9.0 dB | 0.3548134 | 0.9424353 |
| 9.5 dB | 0.3349654 | 0.9482180 |
| 10.0 dB | 0.3162278 | 0.9534626 |

That is, the power normalizer 345 corresponds to the normalizing factor, and reduces the power of the multiplexed signal by a level by which the combiner 340 has increased the power.

In this case, each of the normalizing factor and the scaling factor may be a rational number that is larger than 0 and smaller than 1.

In this case, the scaling factor may decrease as a reduction in power corresponding to the injection level controller 330 becomes larger, and the normalizing factor may increase as a reduction in power corresponding to the injection level controller 330 becomes larger.

The power normalized signal passes through the time interleaver 350 for distributing burst errors occurring over a channel.

In this case, the time interleaver 350 may be viewed as performing interleaving that is applied to both the core layer signal and the enhanced layer signal. That is, the core layer and the enhanced layer share the time interleaver, thereby preventing the unnecessary use of memory and also reducing latency at the receiver.

Although will be described later in greater detail, the enhanced layer signal may correspond to enhanced layer data restored based on cancellation corresponding to the restoration of core layer data corresponding to the core layer signal. The combiner 340 may combine one or more extension layer signals having power levels lower than those of the core layer signal and the enhanced layer signal with the core layer signal and the enhanced layer signal.

Meanwhile, L1 signaling information including injection level information is encoded by the L1 signaling generation unit 360 including signaling-dedicated BICM. In this case, the L1 signaling generation unit 360 may receive injection level information IL INFO from the injection level controller 330, and may generate an L1 signaling signal.

In L1 signaling, L1 refers to Layer-1 in the lowest layer of the ISO 7 layer model. In this case, the L1 signaling may be included in a preamble.

In general, the L1 signaling may include an FFT size, a guard interval size, etc., i.e., the important parameters of the OFDM transmitter, a channel code rate, modulation information, etc., i.e., BICM important parameters. This L1 signaling signal is combined with data signal into a broadcast signal frame.

The frame builder 370 generates a broadcast signal frame by combining the L1 signaling signal with a data signal.

The broadcast signal frame may be transmitted via the OFDM transmitter that is robust to a multi-path and the Doppler phenomenon. In this case, the OFDM transmitter may be viewed as being responsible for the transmission signal generation of the next generation broadcasting system.

Figure 4:
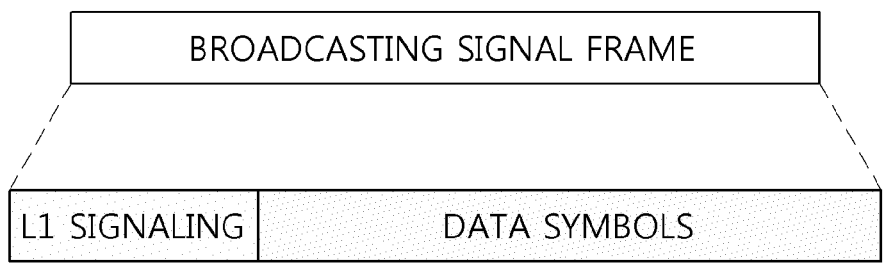
FIG. 4 is a diagram showing an example of the structure of a broadcast signal frame.

FIG. 4 is a diagram showing an example of the structure of a broadcast signal frame.

Referring to FIG. 4, a broadcast signal frame includes an L1 signaling signal and a data signal. For example, the broadcast signal frame may be an ATSC 3.0 frame.

Figure 5:
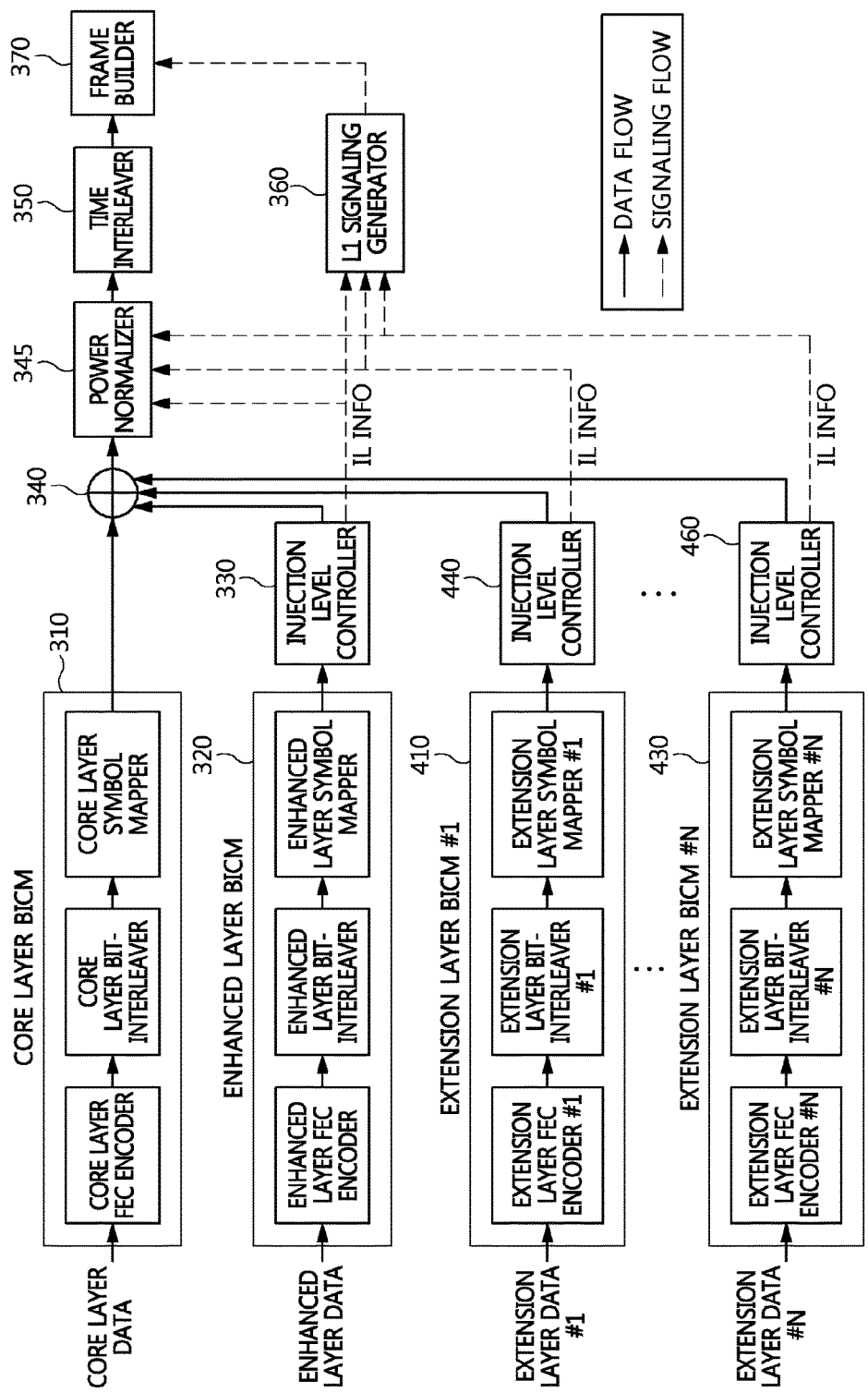
FIG. 5 is a block diagram showing another example of the signal multiplexer shown in FIG. 1.

FIG. 5 is a block diagram showing another example of the signal multiplexer shown in FIG. 1.

Referring to FIG. 5, it can be seen that a signal multiplexer multiplexes data corresponding to N (N is a natural number that is equal to or larger than 1) extension layers together in addition to core layer data and enhanced layer data.

That is, the signal multiplexer shown in FIG. 5 includes N extension layer BICM units 410, . . . , 430 and injection level controllers 440, . . . , 460 in addition to a core layer BICM unit 310, an enhanced layer BICM unit 320, an injection level controller 330, a combiner 340, a power normalizer 345, a time interleaver 350, an L1 signaling generation unit 360, and a frame builder 370.

The core layer BICM unit 310, enhanced layer BICM unit 320, injection level controller 330, combiner 340, power normalizer 345, time interleaver 350, L1 signaling generation unit 360 and frame builder 370 shown in FIG. 5 have been described in detail with reference to FIG. 3.

Each of the N extension layer BICM units 410, . . . , 430 independently performs BICM encoding, and each of the injection level controllers 440, . . . , 460 performs power reduction corresponding to a corresponding extension layer, thereby enabling a power reduced extension layer signal to be combined with other layer signals via the combiner 340.

In this case, each of the error correction encoders of the extension layer BICM units 410, . . . , 430 may be formed by connecting a BCH encoder and an LDPC encoder in series.

In particular, it is preferred that a reduction in power corresponding to each of the injection level controllers 440, . . . , 460 be higher than the reduction in power of the injection level controller 330. That is, a lower one of the injection level controllers 330, 440, . . . , 460 shown in FIG. 5 may correspond to a larger reduction in power.

Injection level information provided by the injection level controllers 330, 440 and 460 shown in FIG. 5 is included in the broadcast signal frame of the frame builder 370 via the L1 signaling generation unit 360, and is then transmitted to the receiver. That is, the injection level of each layer is contained in the L1 signaling information and then transferred to the receiver.

In the present invention, the adjustment of power may correspond to increasing or decreasing the power of an input signal, and may correspond to increasing or decreasing the gain of an input signal.

The power normalizer 345 mitigates an increase in power caused by the combination of a plurality of layer signals by means of the combiner 340.

In the example shown in FIG. 5, the power normalizer 345 may adjust the power of a signal to appropriate magnitude by multiplying the magnitude of a signal, into which the signals of the respective layers are combined, by a normalizing factor by using Equation 4 below:

$$\text{Normalizing factor} = \left(\sqrt{1 + 10^{-Injectionlevel\#1(dB)/10} + (10^{-Injectionlevel\#2(dB)/10} + \ldots + 10^{-Injectionlevel\#(N+1)(dB)/10}}\right)^{-1} \quad (4)$$

The time interleaver 350 performs interleaving equally applied to the signals of the layers by interleaving the signals combined by the combiner 340.

Figure 6:
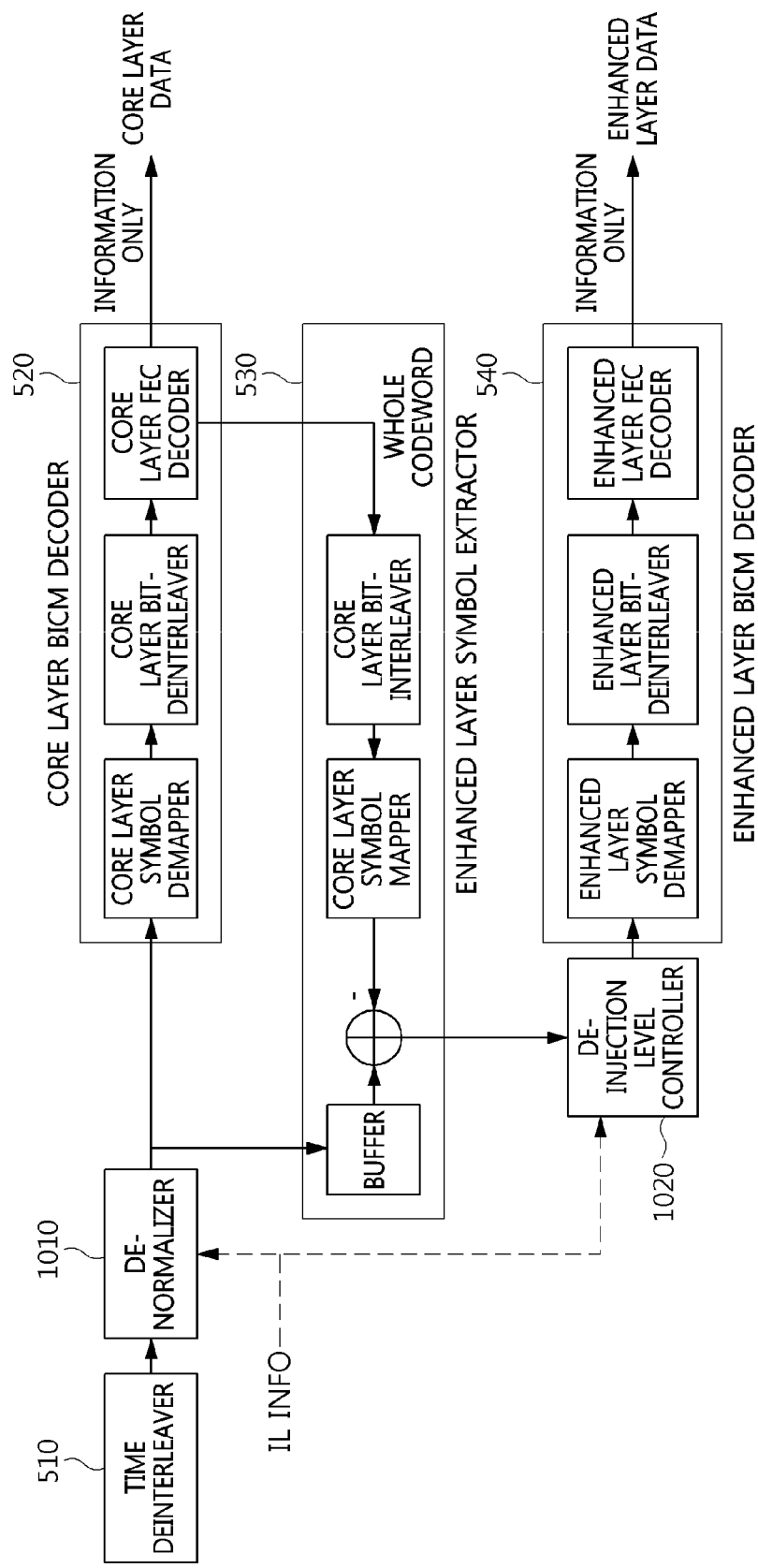
FIG. 6 is a block diagram showing an example of the signal demultiplexer shown in FIG. 1.

FIG. 6 is a block diagram showing still an example of the signal demultiplexer shown in FIG. 1.

Referring to FIG. 6, a signal demultiplexer according to an embodiment of the present invention includes a time deinterleaver 510, a de-normalizer 1010, core layer BICM decoder 520, an enhanced layer symbol extractor 530, a de-injection level controller 1020, and an enhanced layer BICM decoder 540.

In this case, the signal demultiplexer shown in FIG. 6 may correspond to the signal multiplexer shown in FIG. 3.

The time deinterleaver 510 receives a received signal from an OFDM receiver for performing operations, such as time/frequency synchronization, channel estimation and equalization, and performs an operation related to the distribution of burst errors occurring over a channel. In this case, the L1 signaling information is decoded by the OFDM receiver first, and is then used for the decoding of data. In particular, the injection level information of the L1 signaling information may be transferred to the de-normalizer 1010 and the de-injection level controller 1020. In this case, the OFDM receiver may decode the received signal in the form of a broadcast signal frame, for example, an ATSC 3.0 frame, may extract the data symbol part of the frame, and may provide the extracted data symbol part to the time deinterleaver 510. That is, the time deinterleaver 510 distributes burst errors occurring over a channel by performing deinterleaving while passing a data symbol therethrough.

The de-normalizer 1010 corresponds to the power normalizer of the transmitter, and increases power by a level by which the power normalizer has decreased the power. That is, the de-normalizer 1010 divides the received signal by the normalizing factor of Equation 2.

Although the de-normalizer 1010 is illustrated as adjusting the power of the output signal of the time interleaver 510 in the example shown in FIG. 6, the de-normalizer 1010 may be located before the time interleaver 510 so that power adjustment is performed before interleaving in some embodiments.

That is, the de-normalizer 1010 may be viewed as being located before or after the time interleaver 510 and amplifying the magnitude of a signal for the purpose of the LLR calculation of the core layer symbol demapper.

The output of the time deinterleaver 510 (or the output of the de-normalizer 1010) is provided to the core layer BICM decoder 520, and the core layer BICM decoder 520 restores core layer data.

In this case, the core layer BICM decoder 520 includes a core layer symbol demapper, a core layer bit deinterleaver, and a core layer error correction decoder. The core layer symbol demapper calculates LLR values related to symbols, the core layer bit deinterleaver strongly mixes the calculated LLR values with burst errors, and the core layer error correction decoder corrects error occurring over a channel.

In this case, the core layer symbol demapper may calculate an LLR value for each bit using a predetermined constellation. In this case, the constellation used by the core layer symbol mapper may vary depending on the combination of the code rate and the modulation order that are used by the transmitter.

In this case, the core layer bit deinterleaver may perform deinterleaving on calculated LLR values on an LDPC code word basis.

In particular, the core layer error correction decoder may output only information bits, or may output all bits in which information bits have been mixed with parity bits. In this case, the core layer error correction decoder may output only information bits as core layer data, and may output all bits in which information bits have been mixed with parity bits to the enhanced layer symbol extractor 530.

The core layer error correction decoder may be formed by connecting a core layer LDPC decoder and a core layer BCH decoder in series. That is, the input of the core layer error correction decoder may be input to the core layer LDPC decoder, the output of the core layer LDPC decoder may be input to the core layer BCH decoder, and the output of the core layer BCH decoder may become the output of the core layer error correction decoder. In this case, the LDPC decoder performs LDPC decoding, and the BCH decoder performs BCH decoding.

Furthermore, the enhanced layer error correction decoder may be formed by connecting an enhanced layer LDPC decoder and an enhanced layer BCH decoder in series. That is, the input of the enhanced layer error correction decoder may be input to the enhanced layer LDPC decoder, the output of the enhanced layer LDPC decoder may be input to the enhanced layer BCH decoder, and the output of the enhanced layer BCH decoder may become the output of the enhanced layer error correction decoder.

The enhanced layer symbol extractor 530 may receive all bits from the core layer error correction decoder of the core layer BICM decoder 520, may extract enhanced layer symbols from the output signal of the time deinterleaver 510 or de-normalizer 1010. In an embodiment, the enhanced layer symbol extractor 530 may not be provided with all bits by the error correction decoder of the core layer BICM decoder 520, but may be provided with LDPC information bits or BCH information bits by the error correction decoder of the core layer BICM decoder 520.

In this case, the enhanced layer symbol extractor 530 includes a buffer, a subtracter, a core layer symbol mapper, and a core layer bit interleaver. The buffer stores the output signal of the time deinterleaver 510 or de-normalizer 1010. The core layer bit interleaver receives the all bits (information bits+parity bits) of the core layer BICM decoder, and performs the same core layer bit interleaving as the transmitter. The core layer symbol mapper generates core layer symbols, which are the same as the transmitter, from the interleaved signal. The subtracter obtains enhanced layer symbols by subtracting the output signal of the core layer symbol mapper from the signal stored in the buffer, and transfers the enhanced layer symbols to the de-injection level controller 1020. In particular, when LDPC information bits are provided, the enhanced layer symbol extractor 530 may further include a core layer LDPC encoder. Furthermore, when BCH information bits are provided, the enhanced layer symbol extractor 530 may further include not only a core layer LDPC encoder but also a core layer BCH encoder.

In this case, the core layer LDPC encoder, core layer BCH encoder, core layer bit interleaver and core layer symbol mapper included in the enhanced layer symbol extractor 530 may be the same as the LDPC encoder, BCH encoder, bit interleaver and symbol mapper of the core layer described with reference to FIG. 3.

The de-injection level controller 1020 receives the enhanced layer symbols, and increases the power of the input signal by a level by which the injection level controller of the transmitter has decreased the power. That is, the de-injection level controller 1020 amplifies the input signal, and provides the amplified input signal to the enhanced layer BICM decoder 540. For example, if at the transmitter, the power used to combine the enhanced layer signal is lower than the power used to combine the core layer signal by 3 dB, the de-injection level controller 1020 functions to increase the power of the input signal by 3 dB.

In this case, the de-injection level controller 1020 may be viewed as receiving injection level information from the OFDM receiver and multiplying an extracted enhanced layer signal by the enhanced layer gain of Equation 5:

$$\text{Enhanced layer gain} = (\sqrt{10^{-Injectionlevel(dB)/10}})^{-1} \quad (5)$$

The enhanced layer BICM decoder 540 receives the enhanced layer symbol whose power has been increased by the de-injection level controller 1020, and restores the enhanced layer data.

In this case, the enhanced layer BICM decoder 540 may include an enhanced layer symbol demapper, an enhanced layer bit deinterleaver, and an enhanced layer error correction decoder. The enhanced layer symbol demapper calculates LLR values related to the enhanced layer symbols, the enhanced layer bit deinterleaver strongly mixes the calculated LLR values with burst errors, and the enhanced layer error correction decoder corrects error occurring over a channel.

Although the enhanced layer BICM decoder 540 performs a task similar to a task that is performed by the core layer BICM decoder 520, the enhanced layer LDPC decoder generally performs LDPC decoding related to a code rate equal to or higher than 6/15.

For example, the core layer may use LDPC code having a code rate equal to or higher than 5/15, and the enhanced layer may use LDPC code having a code rate equal to or higher than 6/15. In this case, in a reception environment in which enhanced layer data can be decoded, core layer data may be decoded using only a small number of LDPC decoding iterations. Using this characteristic, in the hardware of the receiver, a single LDPC decoder is shared by the core layer and the enhanced layer, and thus the cost required to implement the hardware can be reduced. In this case, the core layer LDPC decoder may use only some time resources (LDPC decoding iterations), and the enhanced layer LDPC decoder may use most time resources.

That is, the signal demultiplexer shown in FIG. 6 restores core layer data first, leaves only the enhanced layer symbols by cancellation the core layer symbols in the received signal symbols, and then restores enhanced layer data by increasing the power of the enhanced layer symbols. As described with reference to FIGS. 5 and 6, signals corresponding to respective layers are combined at different power levels, and thus data restoration having the smallest error can be achieved only if restoration starts with a signal combined with the strongest power.

Accordingly, in the example shown in FIG. 6, the signal demultiplexer may include the time deinterleaver 510 configured to generate a time-deinterleaved signal by applying time deinterleaving to a received signal; a de-normalizer 1010 configured to increase the power of the received signal or the time-deinterleaved signal by a level corresponding to a reduction in power by the power normalizer of the transmitter; the core layer BICM decoder 520 configured to restore core layer data from the signal power-adjusted by the de-normalizer 1010; the enhanced layer symbol extractor 530 configured to extract an enhanced layer signal by performing cancellation, corresponding to the core layer data, on the signal power-adjusted by the de-normalizer 1010 using the output signal of the core layer FEC decoder of the core layer BICM decoder 520; a de-injection level controller 1020 configured to increase the power of the enhanced layer signal by a level corresponding to a reduction in power by the injection power level controller of the transmitter; and an enhanced layer BICM decoder 540 configured to restore enhanced layer data using the output signal of the de-injection level controller 1020.

In this case, the enhanced layer symbol extractor may receive all code words from the core layer LDPC decoder of the core layer BICM decoder, and may immediately perform bit interleaving on the all code words.

In this case, the enhanced layer symbol extractor may receive information bits from the core layer LDPC decoder of the core layer BICM decoder, and may perform core layer LDPC encoding and then bit interleaving on the information bits.

In this case, the enhanced layer symbol extractor may receive information bits from the core layer BCH decoder of the core layer BICM decoder, and may perform core layer BCH encoding and core layer LDPC encoding and then bit interleaving on the information bits.

In this case, the de-normalizer and the de-injection level controller may receive injection level information IL INFO provided based on L1 signaling, and may perform power control based on the injection level information.

In this case, the core layer BICM decoder may correspond to a code rate lower than that of the enhanced layer BICM decoder, and may be more robust than the enhanced layer BICM decoder.

In this case, the de-normalizer may correspond to the reciprocal of the normalizing factor.

In this case, the de-injection level controller may correspond to the reciprocal of the scaling factor.

In this case, the enhanced layer data may be restored based on cancellation corresponding to the restoration of core layer data corresponding to the core layer signal.

In this case, the signal demultiplexer further may include one or more extension layer symbol extractors each configured to extract an extension layer signal by performing cancellation corresponding to previous layer data; one or more de-injection level controllers each configured to increase the power of the extension layer signal by a level corresponding to a reduction in power by the injection level controller of the transmitter; and one or more extension layer BICM decoders configured to restore one or more pieces of extension layer data using the output signals of the one or more de-injection level controllers.

From the configuration shown in FIG. 6, it can be seen that a signal demultiplexing method according to an embodiment of the present invention includes generating a time-deinterleaved signal by applying time deinterleaving to a received signal; increasing the power of the received signal or the time-deinterleaved signal by a level corresponding to a reduction in power by the power normalizer of the transmitter; restoring core layer data from the power-adjusted signal; extracting an enhanced layer signal by performing cancellation, corresponding to the core layer data, on the power-adjusted signal; increasing the power of the enhanced layer signal by a level corresponding to a reduction in power by the injection power level controller of the transmitter; and restoring enhanced layer data using the enhanced layer data.

In this case, extracting the enhanced layer signal may include receiving all code words from the core layer LDPC decoder of the core layer BICM decoder, and immediately performing bit interleaving on the all code words.

In this case, extracting the enhanced layer signal may include receiving information bits from the core layer LDPC decoder of the core layer BICM decoder, and performing core layer LDPC encoding and then bit interleaving on the information bits.

In this case, extracting the enhanced layer signal may include receiving information bits from the core layer BCH decoder of the core layer BICM decoder, and performing core layer BCH encoding and core layer LDPC encoding and then bit interleaving on the information bits.

Figure 7:
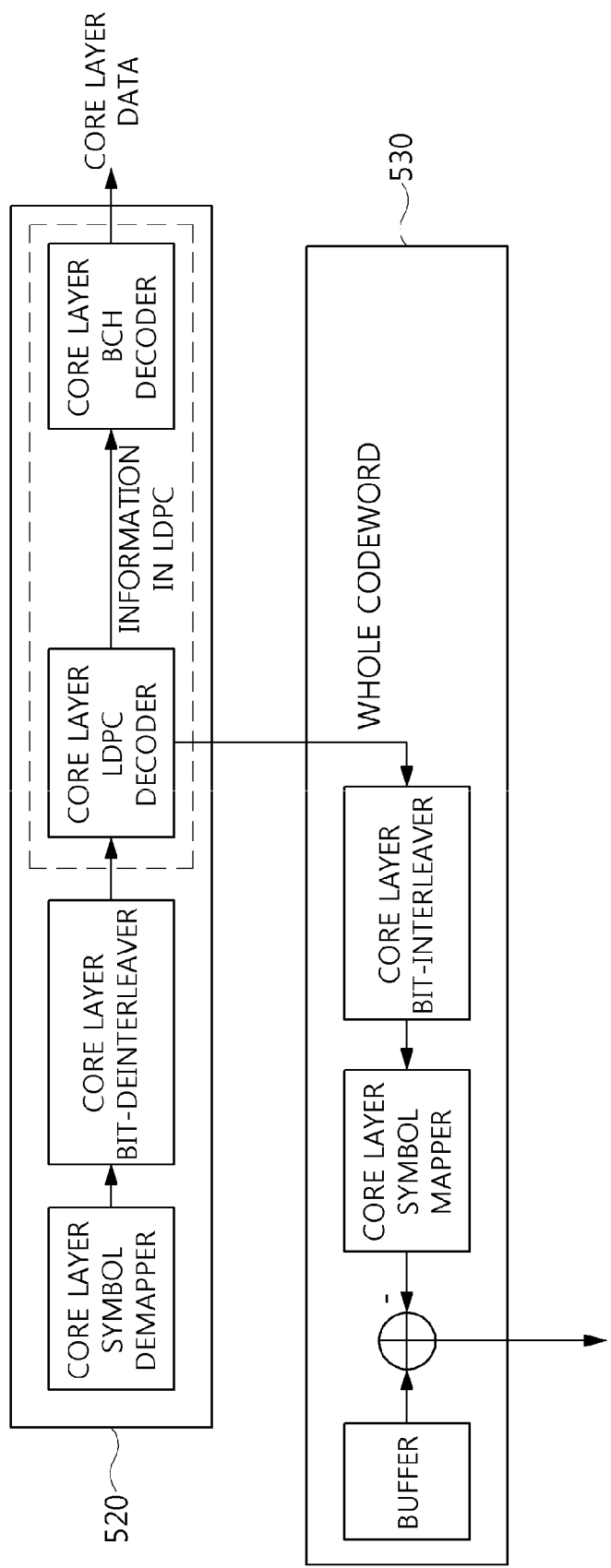
FIG. 7 is a block diagram showing an example of the core layer BICM decoder and the enhanced layer symbol extractor shown in FIG. 6.

FIG. 7 is a block diagram showing an example of the core layer BICM decoder 520 and the enhanced layer symbol extractor 530 shown in FIG. 6.

Referring to FIG. 7, the core layer BICM decoder 520 includes a core layer symbol demapper, a core layer bit deinterleaver, a core layer LDPC decoder, and a core layer BCH decoder.

That is, in the example shown in FIG. 7, the core layer error correction decoder includes the core layer LDPC decoder and the core layer BCH decoder.

Furthermore, in the example shown in FIG. 7, the core layer LDPC decoder provides all code words, including parity bits, to the enhanced layer symbol extractor 530. That is, although the LDPC decoder generally outputs only the information bits of all the LDPC code words, the LDPC decoder may output all the code words.

In this case, although the enhanced layer symbol extractor 530 may be easily implemented because it does not need to include a core layer LDPC encoder or a core layer BCH encoder, there is a possibility that a residual error may remain in the LDPC code parity part.

Figure 8:
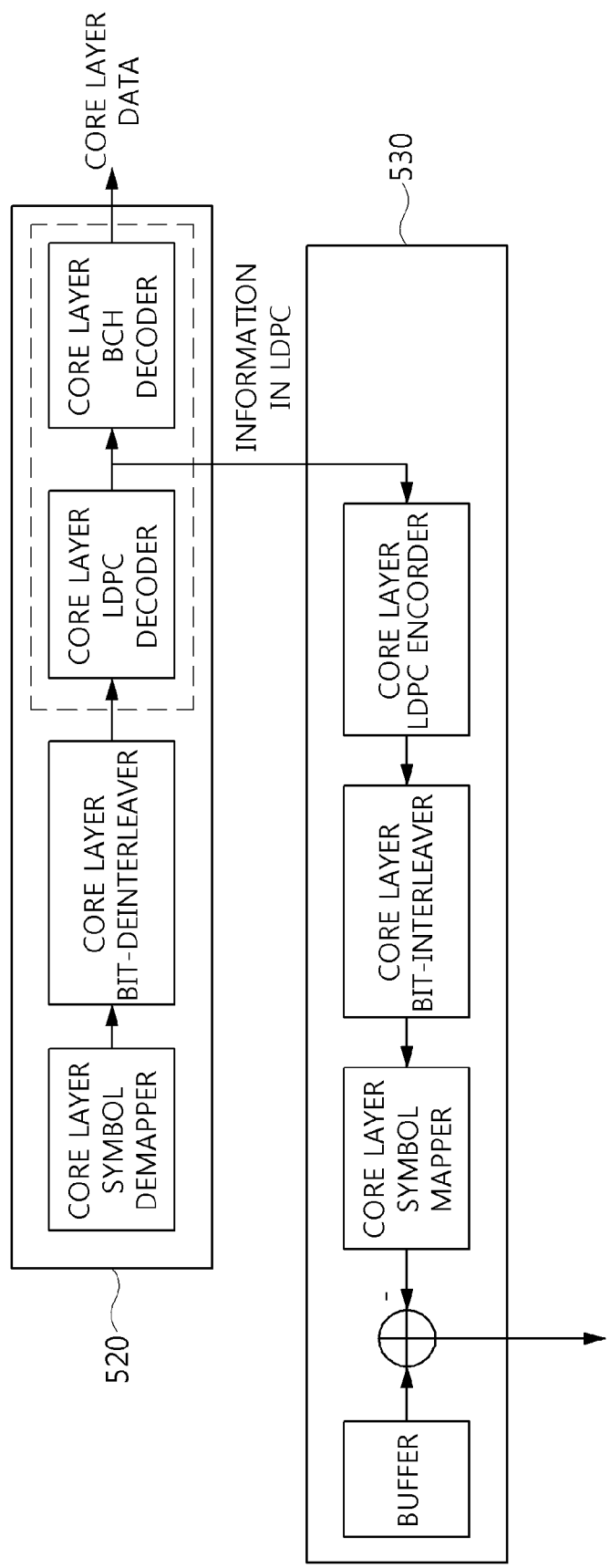
FIG. 8 is a block diagram showing another example of the core layer BICM decoder and the enhanced layer symbol extractor shown in FIG. 6.

FIG. 8 is a block diagram showing another example of the core layer BICM decoder 520 and the enhanced layer symbol extractor 530 shown in FIG. 6.

Referring to FIG. 8, the core layer BICM decoder 520 includes a core layer symbol demapper, a core layer bit deinterleaver, a core layer LDPC decoder, and a core layer BCH decoder.

That is, in the example shown in FIG. 8, the core layer error correction decoder includes the core layer LDPC decoder and the core layer BCH decoder.

Furthermore, in the example shown in FIG. 8, the core layer LDPC decoder provides information bits, excluding parity bits, to the enhanced layer symbol extractor 530.

In this case, although the enhanced layer symbol extractor 530 does not need to include a core layer BCH encoder, it must include a core layer LDPC encoder.

A residual error that may remain in the LDPC code parity part may be eliminated more desirably in the example shown in FIG. 8 than in the example shown in FIG. 7.

Figure 9:
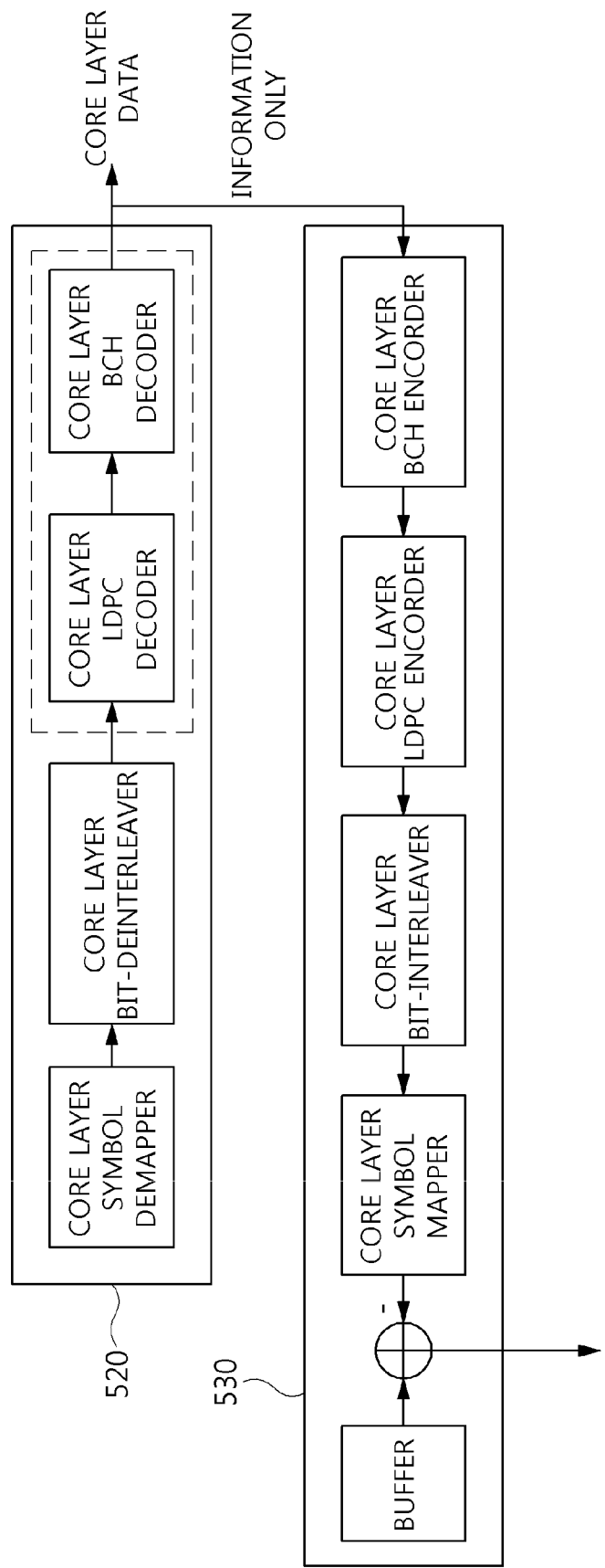
FIG. 9 is a block diagram showing still another example of the core layer BICM decoder and the enhanced layer symbol extractor shown in FIG. 6.

FIG. 9 is a block diagram showing still another example of the core layer BICM decoder 520 and the enhanced layer symbol extractor 530 shown in FIG. 6.

Referring to FIG. 9, the core layer BICM decoder 520 includes a core layer symbol demapper, a core layer bit deinterleaver, a core layer LDPC decoder, and a core layer BCH decoder.

That is, in the example shown in FIG. 9, the core layer error correction decoder includes the core layer LDPC decoder and the core layer BCH decoder.

In the example shown in FIG. 9, the output of the core layer BCH decoder corresponding to core layer data is provided to the enhanced layer symbol extractor 530.

Figure 10:
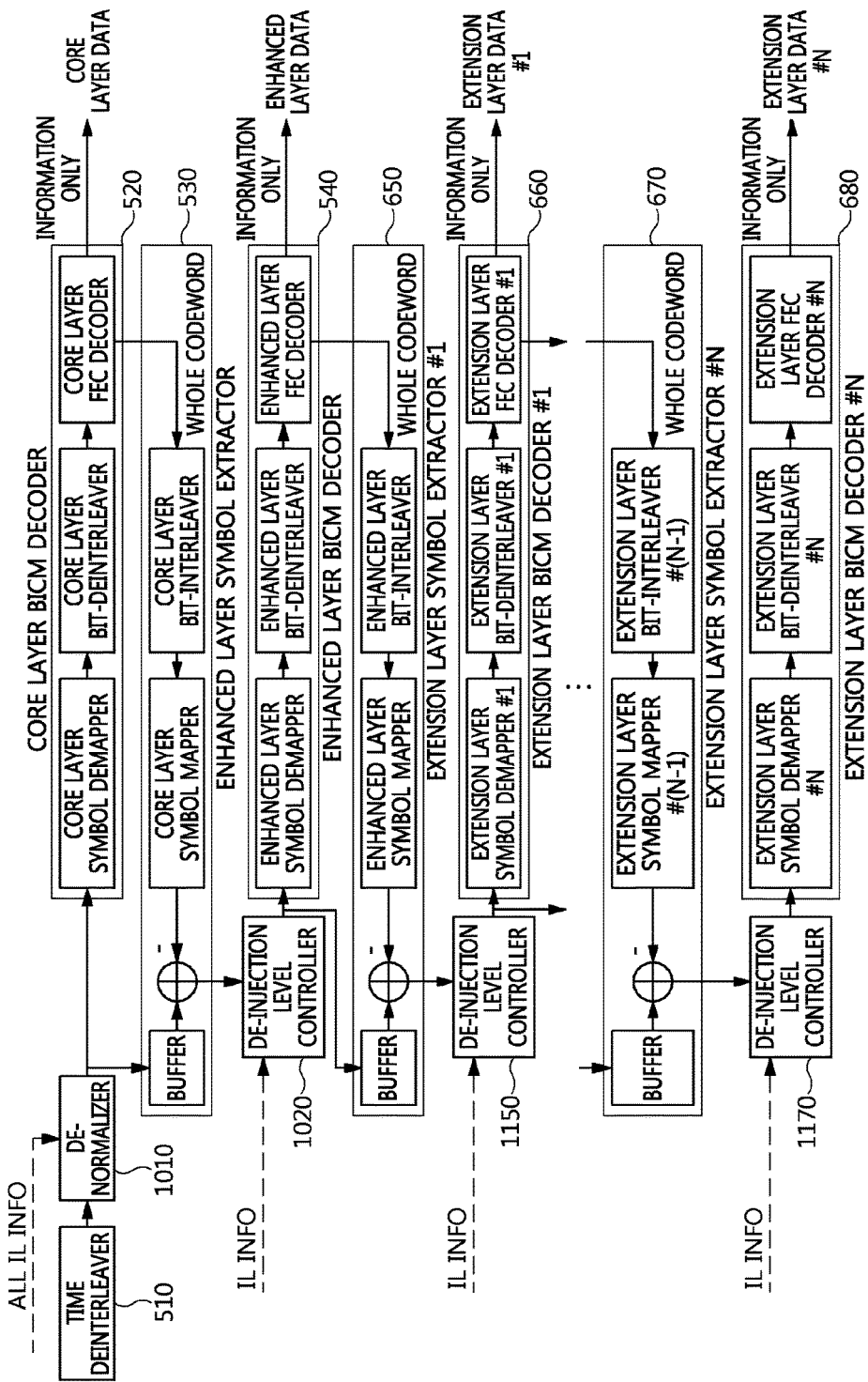
FIG. 10 is a block diagram showing another example of the signal demultiplexer shown in FIG. 1.
Figure 11:
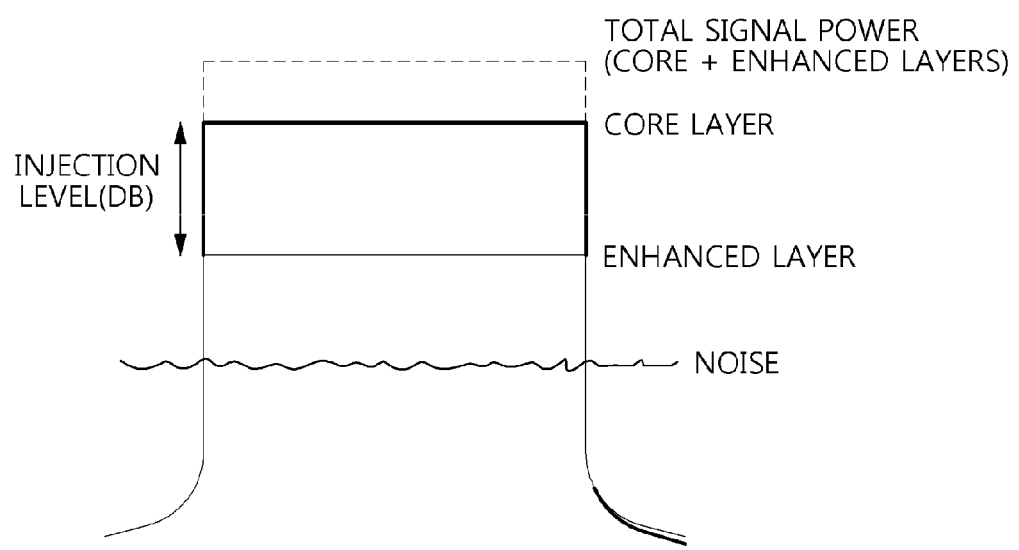
FIG. 11 is a diagram showing an increase in power attributable to the combination of a core layer signal and an enhanced layer signal.

In this case, although the enhanced layer symbol extractor 530 has high complexity because it must include both a core layer LDPC encoder and a core layer BCH encoder, it guarantees higher performance than those in the examples of FIGS. 10 and 11.

FIG. 10 is a block diagram showing another example of the signal demultiplexer shown in FIG. 1.

Referring to FIG. 10, a signal demultiplexer according to an embodiment of the present invention includes a time deinterleaver 510, a de-normalizer 1010, a core layer BICM decoder 520, an enhanced layer symbol extractor 530, an enhanced layer BICM decoder 540, one or more extension layer symbol extractors 650 and 670, one or more extension layer BICM decoders 660 and 680, and de-injection level controllers 1020, 1150 and 1170.

In this case, the signal demultiplexer shown in FIG. 10 may correspond to the signal multiplexer shown in FIG. 5.

The time deinterleaver 510 receives a received signal from an OFDM receiver for performing operations, such as synchronization, channel estimation and equalization, and performs an operation related to the distribution of burst errors occurring over a channel. In this case, L1 signaling information may be decoded by the OFDM receiver first, and then may be used for data decoding. In particular, the injection level information of the L1 signaling information may be transferred to the de-normalizer 1010 and the de-injection level controllers 1020, 1150 and 1170.

In this case, the de-normalizer 1010 may obtain the injection level information of all layers, may obtain a de-normalizing factor using Equation 6 below, and may multiply the input signal with the de-normalizing factor:

In an embodiment, when the N1 signaling includes not only injection level information but also normalizing factor information, the de-normalizer 1010 may simply obtain a de-normalizing factor by taking the reciprocal of a normalizing factor without the need to calculate the de-normalizing factor using an injection level.

The de-normalizer 1010 corresponds to the power normalizer of the transmitter, and increases power by a level by which the power normalizer has decreased the power.

Although the de-normalizer 1010 is illustrated as adjusting the power of the output signal of the time interleaver 510 in the example shown in FIG. 10, the de-normalizer 1010 may be located before the time interleaver 510 so that power adjustment can be performed before interleaving in an embodiment.

That is, the de-normalizer 1010 may be viewed as being located before or after the time interleaver 510 and amplifying the magnitude of a signal for the purpose of the LLR calculation of the core layer symbol demapper.

The output of the time deinterleaver 510 (or the output of the de-normalizer 1010) is provided to the core layer BICM decoder 520, and the core layer BICM decoder 520 restores core layer data.

In this case, the core layer BICM decoder 520 includes a core layer symbol demapper, a core layer bit deinterleaver, and a core layer error correction decoder. The core layer symbol demapper calculates LLR values related to symbols, the core layer bit deinterleaver strongly mixes the calculated LLR values with burst errors, and the core layer error correction decoder corrects error occurring over a channel.

In particular, the core layer error correction decoder may output only information bits, or may output all bits in which information bits have been combined with parity bits. In this case, the core layer error correction decoder may output only information bits as core layer data, and may output all bits in which information bits have been combined with parity bits to the enhanced layer symbol extractor 530.

The core layer error correction decoder may be formed by connecting a core layer LDPC decoder and a core layer BCH decoder in series. That is, the input of the core layer error correction decoder may be input to the core layer LDPC decoder, the output of the core layer LDPC decoder may be input to the core layer BCH decoder, and the output of the core layer BCH decoder may become the output of the core layer error correction decoder. In this case, the LDPC decoder performs LDPC decoding, and the BCH decoder performs BCH decoding.

The enhanced layer error correction decoder may be also formed by connecting an enhanced layer LDPC decoder and an enhanced layer BCH decoder in series. That is, the input of the enhanced layer error correction decoder may be input to the enhanced layer LDPC decoder, the output of the enhanced layer LDPC decoder may be input to the enhanced layer BCH decoder, and the output of the enhanced layer BCH decoder may become the output of the enhanced layer error correction decoder.

$$\text{De-normalizing factor} = (\text{normalizing factor})^{-1} = \left( \sqrt{1 + 10^{-Injectionlevel\#1(dB)/10} + (10^{-Injectionlevel\#2(dB)/10} + \ldots + 10^{-Injectionlevel\#(N+1)(dB)/10})} \right) \quad (6)$$

That is, the de-normalizing factor is the reciprocal of the normalizing factor expressed by Equation 4 above.

Moreover, the extension layer error correction decoder may be also formed by connecting an extension layer LDPC decoder and an extension layer BCH decoder in series. That is, the input of the extension layer error correction decoder may be input to the extension layer LDPC decoder, the output of the extension layer LDPC decoder may be input to the extension layer BCH decoder, and the output of the extension layer BCH decoder may become the output of the extension layer error correction decoder.

In particular, the tradeoff between the complexity of implementation, regarding which of the outputs of the error correction decoders will be used, which has been described with reference to FIGS. 10, 11 and 12, and performance is applied to not only the core layer BICM decoder 520 and enhanced layer symbol extractor 530 of FIG. 10 but also the extension layer symbol extractors 650 and 670 and the extension layer BICM decoders 660 and 680.

The enhanced layer symbol extractor 530 may receive the all bits from the core layer BICM decoder 520 of the core layer error correction decoder, and may extract enhanced layer symbols from the output signal of the time deinterleaver 510 or the denormalizer 1010. In an embodiment, the enhanced layer symbol extractor 530 may not receive all bits from the error correction decoder of the core layer BICM decoder 520, but may receive LDPC information bits or BCH information bits.

In this case, the enhanced layer symbol extractor 530 includes a buffer, a subtracter, a core layer symbol mapper, and a core layer bit interleaver. The buffer stores the output signal of the time deinterleaver 510 or de-normalizer 1010. The core layer bit interleaver receives the all bits (information bits+parity bits) of the core layer BICM decoder, and performs the same core layer bit interleaving as the transmitter. The core layer symbol mapper generates core layer symbols, which are the same as the transmitter, from the interleaved signal. The subtracter obtains enhanced layer symbols by subtracting the output signal of the core layer symbol mapper from the signal stored in the buffer, and transfers the enhanced layer symbols to the de-injection level controller 1020.

In this case, the core layer bit interleaver and core layer symbol mapper included in the enhanced layer symbol extractor 530 may be the same as the core layer bit interleaver and the core layer symbol mapper shown in FIG. 5.

The de-injection level controller 1020 receives the enhanced layer symbols, and increases the power of the input signal by a level by which the injection level controller of the transmitter has decreased the power. That is, the de-injection level controller 1020 amplifies the input signal, and provides the amplified input signal to the enhanced layer BICM decoder 540.

The enhanced layer BICM decoder 540 receives the enhanced layer symbol whose power has been increased by the de-injection level controller 1020, and restores the enhanced layer data.

In this case, the enhanced layer BICM decoder 540 may include an enhanced layer symbol demapper, an enhanced layer bit deinterleaver, and an enhanced layer error correction decoder. The enhanced layer symbol demapper calculates LLR values related to the enhanced layer symbols, the enhanced layer bit deinterleaver strongly mixes the calculated LLR values with burst errors, and the enhanced layer error correction decoder corrects error occurring over a channel.

In particular, the enhanced layer error correction decoder may output only information bits, and may output all bits in which information bits have been combined with parity bits. In this case, the enhanced layer error correction decoder may output only information bits as enhanced layer data, and may output all bits in which information bits have been mixed with parity bits to the extension layer symbol extractor 650.

The extension layer symbol extractor 650 receives all bits from the enhanced layer error correction decoder of the enhanced layer BICM decoder 540, and extracts extension layer symbols from the output signal of the de-injection level controller 1020.

In this case, the de-injection level controller 1020 may amplify the power of the output signal of the subtracter of the enhanced layer symbol extractor 530.

In this case, the extension layer symbol extractor 650 includes a buffer, a subtracter, an enhanced layer symbol mapper, and an enhanced layer bit interleaver. The buffer stores the output signal of the de-injection level controller 1020. The enhanced layer bit interleaver receives the all bits information (bits+parity bits) of the enhanced layer BICM decoder, and performs enhanced layer bit interleaving that is the same as that of the transmitter. The enhanced layer symbol mapper generates enhanced layer symbols, which are the same as those of the transmitter, from the interleaved signal. The subtracter obtains extension layer symbols by subtracting the output signal of the enhanced layer symbol mapper from the signal stored in the buffer, and transfers the extension layer symbols to the extension layer BICM decoder 660.

In this case, the enhanced layer bit interleaver and the enhanced layer symbol mapper included in the extension layer symbol extractor 650 may be the same as the enhanced layer bit interleaver and the enhanced layer symbol mapper shown in FIG. 5.

The de-injection level controller 1150 increases power by a level by which the injection level controller of a corresponding layer has decreased the power at the transmitter.

In this case, the de-injection level controller may be viewed as performing the operation of multiplying the extension layer gain of Equation 7 below. In this case, a 0-th injection level may be considered to be 0 dB:

$$n\text{-}th\ extensionlayergain = \frac{10^{-Injectionlevel\#(n-1)(dB)/10}}{10^{-Injectionlevel\#n(dB)/10}} \quad (7)$$

The extension layer BICM decoder 660 receives the extension layer symbols whose power has been increased by the de-injection level controller 1150, and restores extension layer data.

In this case, the extension layer BICM decoder 660 may include an extension layer symbol demapper, an extension layer bit deinterleaver, and an extension layer error correction decoder. The extension layer symbol demapper calculates LLR values related to the extension layer symbols, the extension layer bit deinterleaver strongly mixes the calculated LLR values with burst errors, and the extension layer error correction decoder corrects error occurring over a channel.

In particular, each of the extension layer symbol extractor and the extension layer BICM decoder may include two or more extractors or decoders if two or more extension layers are present.

That is, in the example shown in FIG. 10, the extension layer error correction decoder of the extension layer BICM decoder 660 may output only information bits, and may output all bits in which information bits have been combined with parity bits. In this case, the extension layer error correction decoder outputs only information bits as extension layer data, and may output all bits in which information bits have been mixed with parity bits to the subsequent extension layer symbol extractor 670.

The configuration and operation of the extension layer symbol extractor 670, the extension layer BICM decoder 680 and the de-injection level controller 1170 can be easily understood from the configuration and operation of the above-described extension layer symbol extractor 650, extension layer BICM decoder 660 and de-injection level controller 1150.

A lower one of the de-injection level controllers 1020, 1150 and 1170 shown in FIG. 10 may correspond to a larger increase in power. That is, the de-injection level controller 1150 may increase power more than the de-injection level controller 1020, and the de-injection level controller 1170 may increase power more than the de-injection level controller 1150.

It can be seen that the signal demultiplexer shown in FIG. 10 restores core layer data first, restores enhanced layer data using the cancellation of core layer symbols, and restores extension layer data using the cancellation of enhanced layer symbols. Two or more extension layers may be provided, in which case restoration starts with an extension layer combined at a higher power level.

FIG. 11 is a diagram showing an increase in power attributable to the combination of a core layer signal and an enhanced layer signal.

Referring to FIG. 11, it can be seen that when a multiplexed signal is generated by combining a core layer signal with an enhanced layer signal whose power has been reduced by an injection level, the power level of the multiplexed signal is higher than the power level of the core layer signal or the enhanced layer signal.

In this case, the injection level that is adjusted by the injection level controllers shown in FIGS. 6 and 8 may be adjusted from 3.0 dB to 10.0 dB in steps of 0.5 dB. When the injection level is 3.0 dB, the power of the enhanced layer signal is lower than that of the core layer signal by 3 dB. When the injection level is 10.0 dB, the power of the enhanced layer signal is lower than that of the core layer signal by 10 dB. This relationship may be applied not only between a core layer signal and an enhanced layer signal but also between an enhanced layer signal and an extension layer signal or between extension layer signals.

The power normalizers shown in FIGS. 6 and 8 may adjust the power level after the combination, thereby solving problems, such as the distortion of the signal, that may be caused by an increase in power attributable to the combination.

Figure 12:
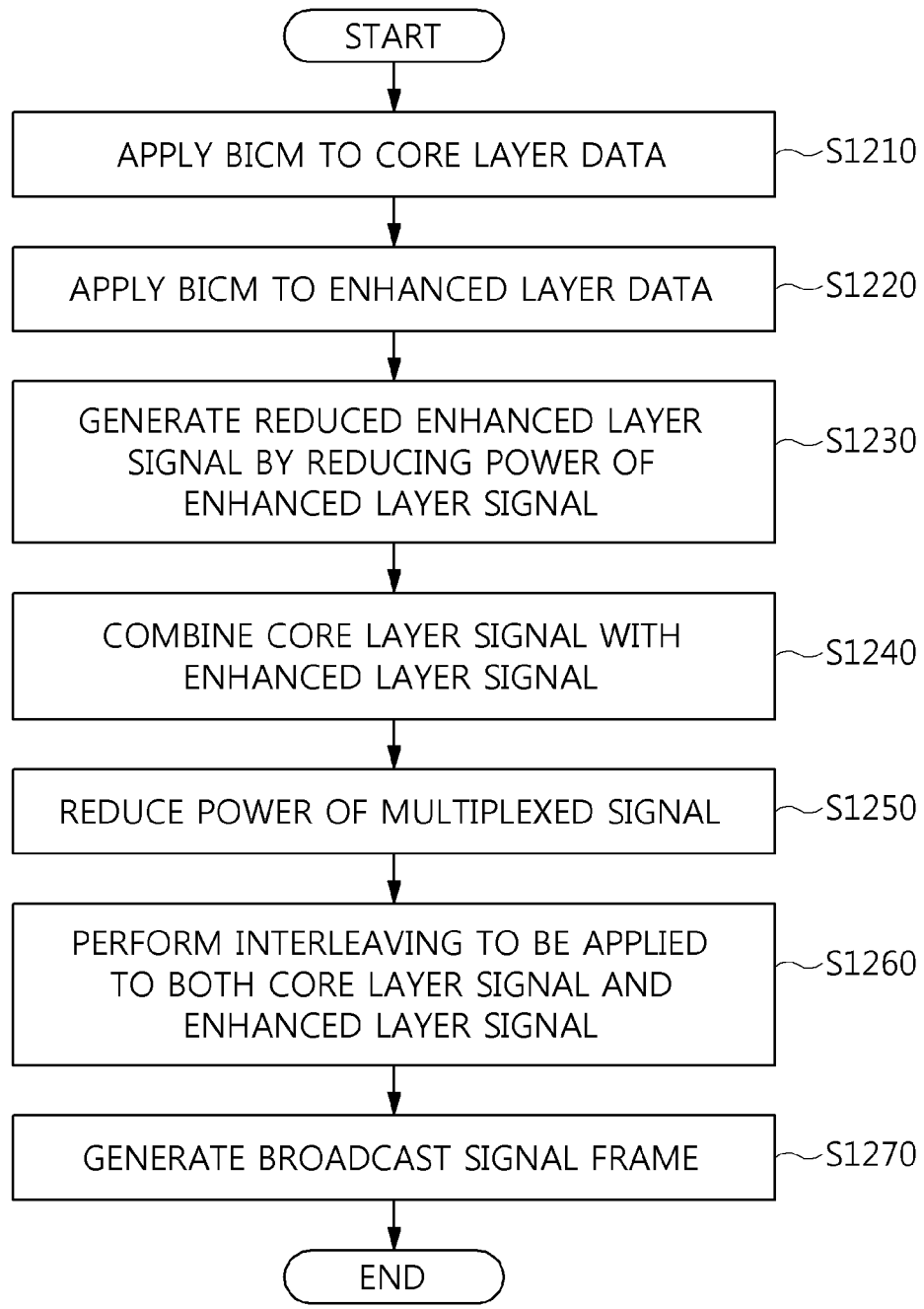
FIG. 12 is an operation flowchart showing a signal multiplexing method according to an embodiment of the present invention.

FIG. 12 is an operation flowchart showing a signal multiplexing method according to an embodiment of the present invention.

Referring to FIG. 12, in the signal multiplexing method according to the embodiment of the present invention, BICM is applied to core layer data at step S1210.

Furthermore, in the signal multiplexing method according to the embodiment of the present invention, BICM is applied to enhanced layer data at step S1220.

The BICM applied at step S1220 may be different from the BICM applied to step S1210. In this case, the BICM applied at step S1220 may be less robust than the BICM applied to step S1210. In this case, the bit rate of the BICM applied at step S1220 may be less robust than that of the BICM applied to step S1210.

In this case, an enhanced layer signal may correspond to the enhanced layer data that is restored based on cancellation corresponding to the restoration of the core layer data corresponding to a core layer signal.

Furthermore, in the signal multiplexing method according to the embodiment of the present invention, a power-reduced enhanced layer signal is generated by reducing the power of the enhanced layer signal at step S1230.

In this case, at step S1230, an injection level may be changed from 3.0 dB to 10.0 dB in steps of 0.5 dB.

Furthermore, in the signal multiplexing method according to the embodiment of the present invention, a multiplexed signal is generated by combining the core layer signal and the power-reduced enhanced layer signal at step S1240.

That is, at step S1240, the core layer signal and the enhanced layer signal are combined at different power levels so that the power level of the enhanced layer signal is lower than the power level of the core layer signal.

In this case, at step S1240, one or more extension layer signals having lower power levels than the core layer signal and the enhanced layer signal may be combined with the core layer signal and the enhanced layer signal.

Furthermore, in the signal multiplexing method according to the embodiment of the present invention, the power of the multiplexed signal is reduced at step S1250.

In this case, at step S1250, the power of the multiplexed signal may be reduced to the power of the core layer signal. In this case, at step S1250, the power of the multiplexed signal may be reduced by a level by which the power has been increased at step S1240.

Furthermore, in the signal multiplexing method according to the embodiment of the present invention, a time-interleaved signal is generated by performing time interleaving that is applied to both the core layer signal and the enhanced layer signal is performed at step S1260.

Furthermore, in the signal multiplexing method according to the embodiment of the present invention, a broadcast signal frame is generated using the time-interleaved signal and L1 signaling information at step S1270.

In this case, the broadcast signal frame may be an ATSC 3.0 frame.

In this case, the L1 signaling information may include injection level information and/or normalizing factor information.

Although not explicitly shown in FIG. 12, the signal multiplexing method may further include the step of generating L1 signaling information including injection level information corresponding to step S1230.

The signal multiplexing method shown in FIG. 12 may correspond to step S210 shown in FIG. 2.

The Layered Division Multiplexing (LDM) explained above may be applied to a next generation broadcasting system such as ATSC 3.0 because it supports multiple services simultaneously and each service can use 100% of time and frequency resources.

Especially, the Layered Division Multiplexing technology may provide more flexible and efficient broadcasting services to users when it is combined with scalable video codec technologies such as SVC or SHVC.

The broadcasting system which uses Layered Division Multiplexing (LDM) as a physical layer of the broadcasting system improve the advantages and purposes of the scalable video codec when the scalable video codec such as SVC or HEVC is used for video coding.

Figure 13:
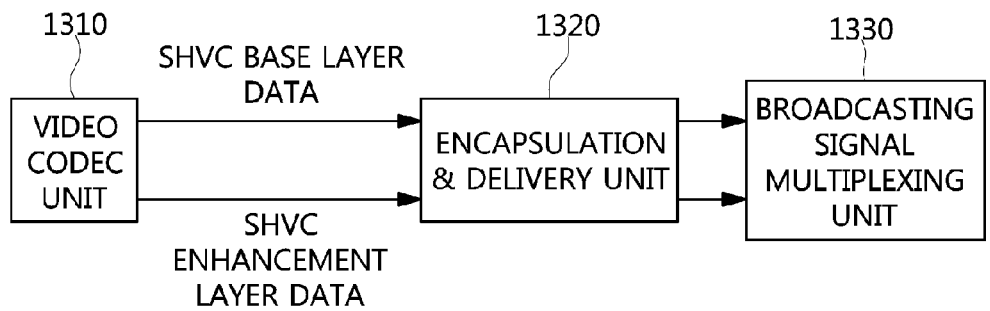
FIG. 13 a block diagram showing an apparatus for broadcasting scalable video contents according to an embodiment of the present invention.

FIG. 13 a block diagram showing an apparatus for broadcasting scalable video contents according to an embodiment of the present invention.

Referring to FIG. 13, the apparatus for broadcasting scalable video contents according to an embodiment of the present invention includes a video codec unit 1310, an encapsulation and delivery unit 1320 and a broadcasting signal multiplexing unit 1330.

The video codec unit 1310 generates a plurality of codec layer signals by dividing codec media stream into a plurality of layers.

In the example showed in FIG. 13, SHVC is used as a video codec and the media contents to be serviced are generated into two layer of a base layer and an enhancement layer.

In this case, the base layer may include image information corresponding to High Definition (HD) grade resolution. In this case, the combination of the base layer and the enhancement layer may provide image information corresponding to Ultra High Definition (Ultra-HD) grade resolution.

The base layer signal and the enhancement layer signal generated by the video codec unit 1310 are inputted to the encapsulation and delivery unit 1320.

The encapsulation and delivery unit 1320 performs a transformation for transferring on the codec layer signals.

That is, the encapsulation and delivery unit 1320 performs a role of transforming pure media contents data into a form capable of transferring.

In this case, the encapsulation and delivery unit 1320 may provide the broadcasting signal multiplexing unit 1330 with relation information between layers and time stamp information for synchronizing layers along with the media contents data when the input data comprises multiple layers. In this case, the broadcasting signal multiplexing unit 1330 may correspond to a physical layer.

For example, the encapsulation and delivery unit 1320 may be implemented by using the Dynamic Adaptive Streaming over HTTP (DASH) technology or the MPEG Media Transport (MMT) technology.

The broadcasting signal multiplexing unit 1330 generates a layered-division-multiplexed broadcasting signal by combining the codec layer signals at different power levels.

In this case, the broadcasting signal multiplexing unit 1330 may not combine the codec layer signals with one another directly but combine the codec layer signals which are transformed by the encapsulation and delivery unit 1320 with one another.

In this case, the codec layer signals may be one-to-one mapped to the layers of the broadcasting signal multiplexing unit 1330.

In this case, the codec layer signals may include the base layer signal and the enhancement layer signal, the base layer signal may correspond to the core layer signal of the broadcasting signal multiplexing unit 1330 and the enhancement layer signal may correspond to the enhanced layer signal of the broadcast signal multiplexing unit 1330.

In this case, the broadcasting signal multiplexing unit 1330 may correspond to an ATSC3.0 physical layer.

In this case, the broadcasting signal multiplexing unit 1330 may correspond to the signal multiplexer shown in FIG. 3.

The base layer signal transformed by the encapsulation and delivery unit 1320 may be inputted to the core layer BICM as the core layer data, the enhancement layer signal transformed by the encapsulation and delivery unit 1320 may be inputted to the enhanced layer BICM as the enhanced layer data.

The base layer signal and the core layer signal which have passed different BICM are combined at different power levels and may be inputted to the frame builder through the power normalizer and the time interleaver.

Figure 14:
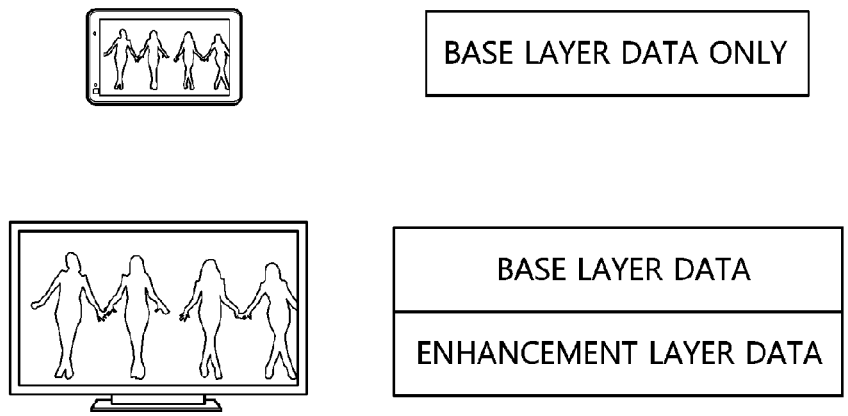
FIG. 14 is a diagram showing an example of the codec layer signals.

FIG. 14 is a diagram showing an example of the codec layer signals.

Referring to FIG. 14, the image corresponding to HD grade resolution may be provided only using the base layer signal among the codec layer signals.

Moreover, the image corresponding to Ultra-HD grade resolution may be provided using the base layer signal and the enhancement layer signal together among the codec layer signals.

Figure 15:
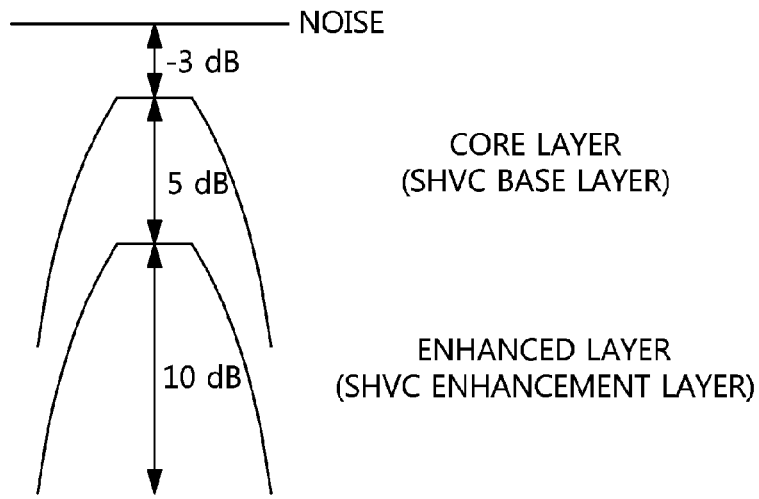
FIG. 15 is a diagram showing a transmission signal spectrum of the apparatus for broadcasting scalable video contents of FIG. 13.

FIG. 15 is a diagram showing a transmission signal spectrum of the apparatus for broadcasting scalable video contents of FIG. 13.

Referring to FIG. 15, the signal outputted from the apparatus for broadcasting scalable video contents is transferring in a spectrum overlay form.

The receiver based on the Layered Division Multiplexing (LDM) decodes the core layer (top level layer) first, and then decodes the lower layers sequentially. It is very similar with the decoding process of the scalable video codec such as SVC or SHVC in which the base layer is decoded first and then the enhancement layers are decoded sequentially.

There are many cases in which the receiver does not provide enough scalability because the transferring physical layer does not provide proper scalability even if the high level scalability is provided by the video codec. The prevent invention can solve the problem.

That is, the sequential decoding environment which is proper to the SVC or SHVC, is provided because the physical layer performs sequential decoding when the layered division multiplexing (LDM) system is used. Therefore, the scalability of media contents is guaranteed.

For example, the mobile device or the tablet device which has small screen and the limited performance decodes only core layer so that reconstruct media contents corresponding to the base layer of the SHVC for providing users with HD grade resolution image. For example, the TV which has big screen and excellent performance decodes the core layer first and then decodes the enhanced layer so that reconstruct media contents corresponding to the SHVC base layer and the SHVC enhancement layer for providing users with Ultra-HD grade resolution image.

Figure 16:
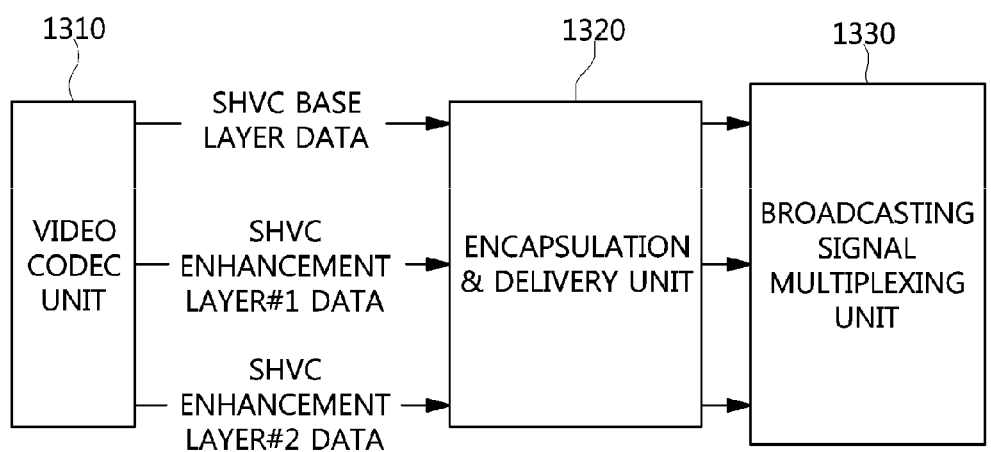
FIG. 16 is a block diagram showing an apparatus for broadcasting scalable video contents according to another embodiment of the present invention.

FIG. 16 is a block diagram showing an apparatus for broadcasting scalable video contents according to another embodiment of the present invention.

Referring to FIG. 16, the apparatus for broadcasting scalable video contents includes a video codec unit 1310, an encapsulation and delivery unit 1320 and a broadcasting signal multiplexing unit 1330.

The example shown in FIG. 16 may correspond to a broadcasting transmitter based on the Layered Division Multiplexing (LDM) for SHVC media stream broadcasting service which has three layers.

Figure 17:
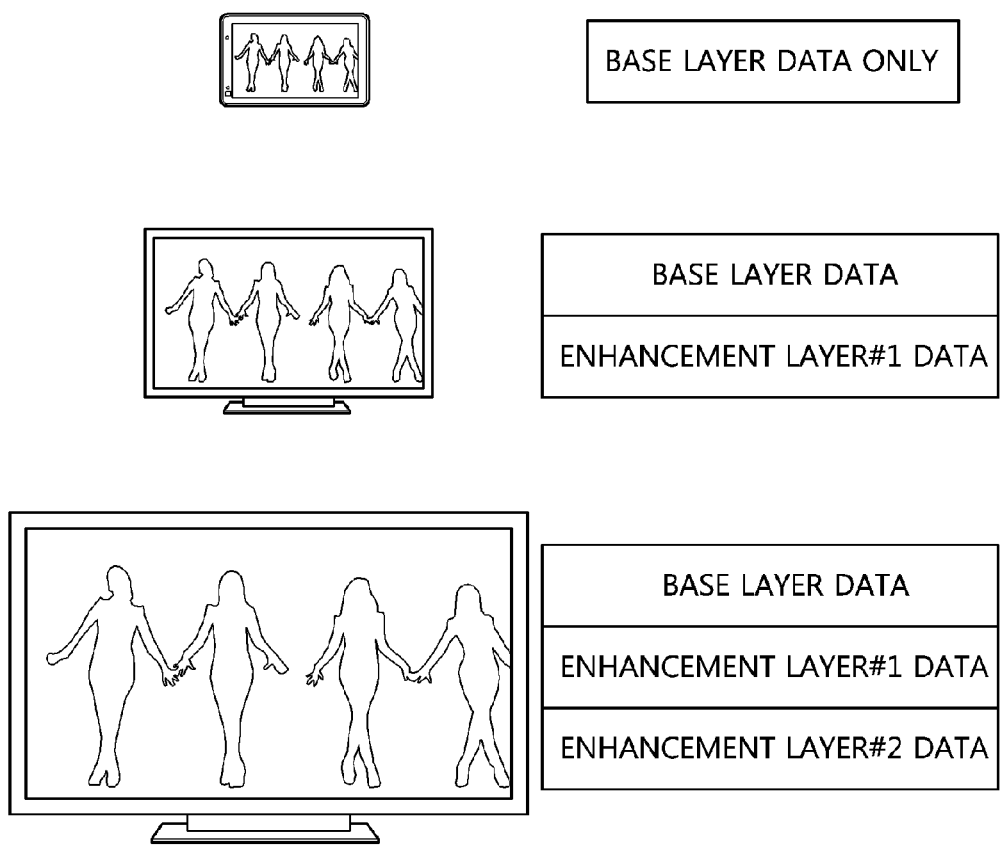
FIG. 17 is a diagram showing another example of the codec layer signals.

FIG. 17 is a diagram showing another example of the codec layer signals.

Referring to FIG. 17, the receiver which can receive only the SHVC base layer may provide the broadcasting service in a grade corresponding to the lowest resolution.

The regular TV may decode the combination of the base layer and the enhancement layer #1 for providing higher resolution service.

The mega TV may decode the combination of the base layer, the enhancement layer #1 and the enhancement layer #2 for providing the highest resolution service.

The broadcasting signal multiplexing unit 1330 shown in FIG. 16 may correspond to the signal multiplexer (case of one extension layer) shown in FIG. 5. The SHVC base layer data may be demodulated by the core layer BICM, the SHVC enhancement layer #1 data may be demodulated by the enhanced layer BICM, and the SHVC enhancement layer #2 data may be demodulated by the extension layer BICM. The signals demodulated by BICMs are combined at different power levels and are transferred to the frame builder through the time interleaver.

Figure 18:
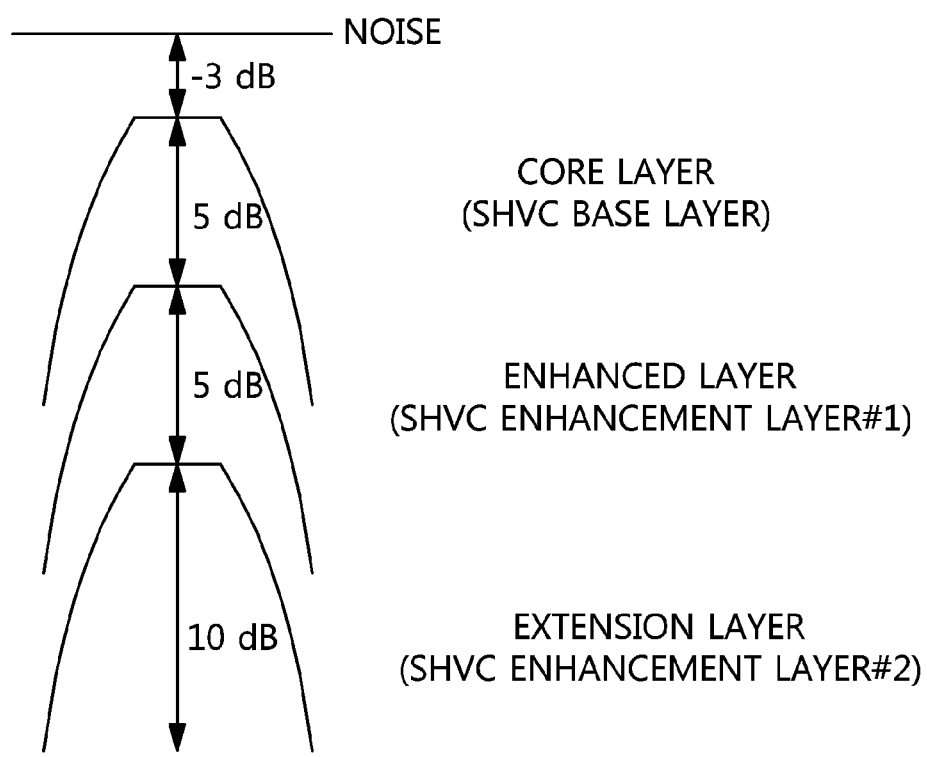
FIG. 18 is a diagram showing a transmission signal spectrum of the apparatus for broadcasting scalable video contents of FIG. 16.

FIG. 18 is a diagram showing a transmission signal spectrum of the apparatus for broadcasting scalable video contents of FIG. 16.

Referring to FIG. 18, the signal outputted from the apparatus for broadcasting scalable video contents is transferred in a triple spectrum overlay form.

According to the embodiments, two SHVC layers are mapped into one physical layer for transferring when the SHVC media stream which has three layers is transferred.

That is, the LDM broadcasting system which has two fixed layers for reducing the receiver complexity may generate one media stream by combining two or more SHVC enhancement layers by a multiplexer (MUX).

For example, the SHVC base layer data may be demodulated by the core layer BICM and the SHVC enhancement layer #1 data and the SHVC enhancement layer #2 data may be demodulated by single enhanced layer BICM after combining by the multiplexer when the SHVC base layer data, the SHVC enhancement layer #1 data and the SHVC enhancement layer #2 data are provide to the broadcasting signal multiplexing unit as shown in FIG. 16.

Figure 19:
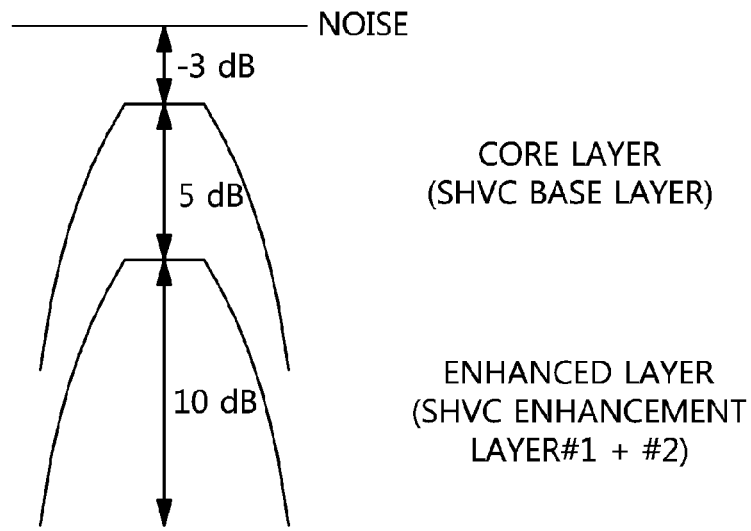
FIG. 19 is a diagram showing a transmission signal spectrum when two enhancement layer signals are mapped into single enhanced layer.

FIG. 19 is a diagram showing a transmission signal spectrum when two enhancement layer signals are mapped into single enhanced layer.

Referring to FIG. 19, two layers are transformed in a form of spectrum overlay. In this case, the enhanced layer of the physical layer may perform a role of transferring information corresponding to the SHVC enhancement layer #1 and the SHVC enhancement layer #2.

Thus, the entire media stream service for three or more video codec layers with two BICM blocks may be possible when the multiple video codec layers are combined and mapped into single LDM layer.

Figure 20:
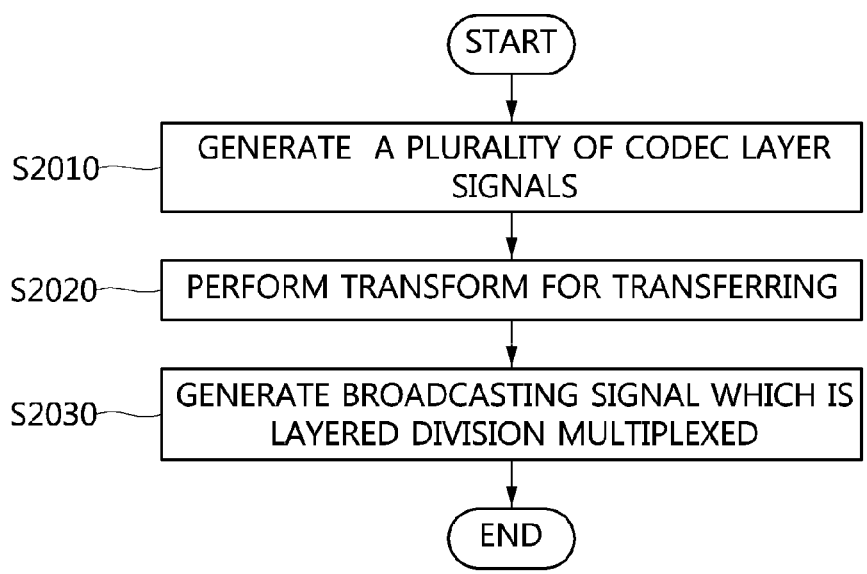
FIG. 20 is an operation flowchart showing a method of broadcasting scalable video contents according to an embodiment of the present invention.

FIG. 20 is an operation flowchart showing a method of broadcasting scalable video contents according to an embodiment of the present invention.

Referring to FIG. 20, in the method of broadcasting scalable video contents according to the embodiment of the present invention, a plurality of codec layer signals are generated at step S2010.

In this case, the codec layer signals may be generated by dividing codec media stream into a plurality of layers.

Furthermore, in the method of broadcasting scalable video contents according to the embodiment of the present invention, a transformation for transferring is performed on the codec layer signals at step S2020.

Furthermore, in the method of broadcasting scalable video contents according to the embodiment of the present invention, a layered-division-multiplexed broadcasting signal is generated by combining the codec layer signals at different power levels at step 2030.

In this case, the codec layer signals may be one-to-one mapped into layers of a layered-division-multiplexing corresponding to the layered-division-multiplexed broadcasting signal.

In this case, the codec layer signals may include a base layer signal and an enhancement layer signal, and the base layer signal may correspond to a core layer signal of the layered-division-multiplexing and the enhancement layer signal may correspond to an enhanced layer signal of the layered-division-multiplexing.

In this case, the generating the layered-division-multiplexed broadcasting signal may comprises: generating a multiplexed signal by combining the core layer signal and the enhanced layer signal at different power levels; reducing power of the multiplexed signal to a power level corresponding to the core layer signal; generating a time-interleaved signal by performing interleaving that is applied to both the core layer signal and the enhanced layer signal; and generating a broadcast signal frame corresponding to the layered-division-multiplexed broadcasting signal using the time-interleaved signal and L1 signaling information.

In this case, the generating the multiplexed signal may comprise combining one or more extension layer signals, having lower power levels than the core layer signal and the enhanced layer signal, with the core layer signal and the enhanced layer signal.

In this case, the codec layer signals may further include an additional enhancement layer signal, and the additional enhancement layer signal may correspond to the extension layer signal.

In this case, the codec layer signals may include a base layer signal and enhancement layer signals, and the base layer signal may correspond to a core layer signal of a layered-division-multiplexing and the enhancement layer signals may correspond to an enhanced layer signal of the layered-division-multiplexing.

Figure 21:
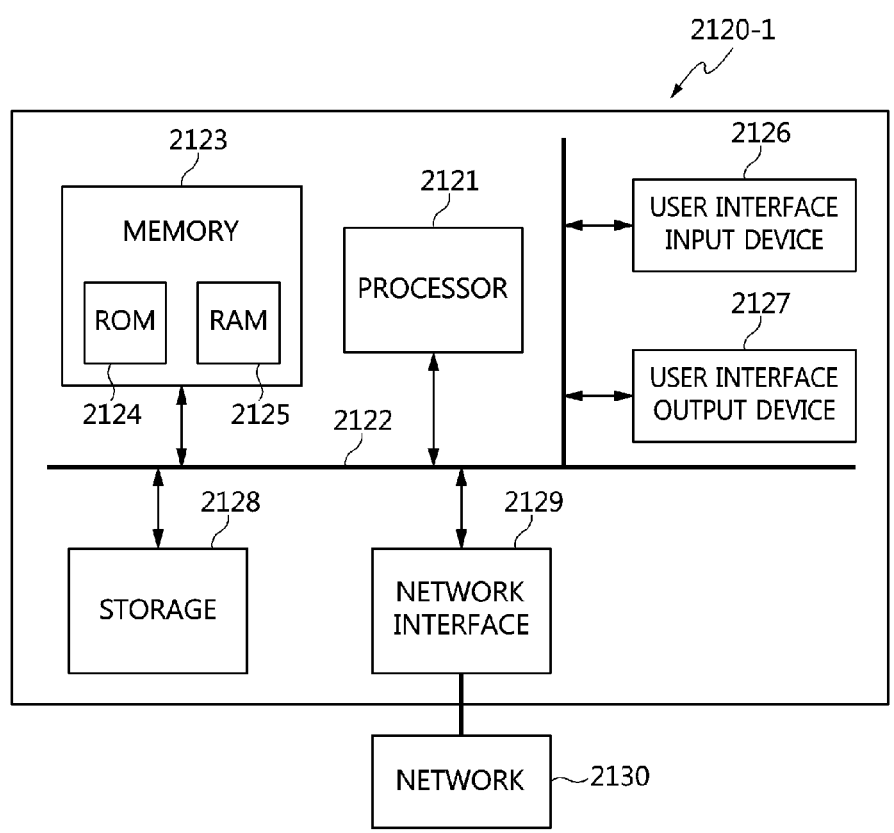
FIG. 21 is a block diagram showing an exemplary computer system in which the present invention is implemented.

FIG. 21 is a block diagram showing an exemplary computer system in which the present invention is implemented.

Referring to FIG. 21, the embodiment of the present invention may be implemented in a computer system, e.g., as a computer readable medium. As shown in FIG. 21, a computer system 2120-1 may include one or more of a processor 2121, a memory 2123, a user input device 2126, a user output device 2127, and a storage 2128, each of which communicates through a bus 2122. The computer system 2120-1 may also include a network interface 2129 that is coupled to a network 2130. The processor 2121 may be a central processing unit (CPU) or a semiconductor device that executes processing instructions stored in the memory 2123 and/or the storage 2128. The memory 2123 and the storage 2128 may include various forms of volatile or non-volatile storage media. For example, the memory may include a read-only memory (ROM) 2124 and a random access memory (RAM) 2125.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to the present invention, a more flexible and advanced broadcasting service by efficiently multiplexing scalable video contents using scalable video codecs such as SVC (Scalable Video Coding) or SHVC (Scalable-HEVC Video Coding) is provided to users.

Furthermore, according to the present invention, high level flexibilities and excellent performances by combining scalable video codecs such as SVC or HEVC and transferring/receiving technologies based on Layered Division Multiplexing (LDM) for next generation broadcasting system are provided.

As described above, the apparatus and method for broadcasting scalable video contents according to the present invention are not limited to the configurations and methods of the aforementioned embodiments, but some or all of the embodiments may be selectively combined such that the embodiments are modified in various manners.

What is claimed is:

1. An apparatus for broadcasting scalable video contents, comprising:
 a video codec unit configured to generate a plurality of codec layer signals by dividing codec media stream into a plurality of layers, the codec layer signals including a base layer signal and an enhancement layer signal of scalable video codec layer signals corresponding to a scalable video coding; and
 a broadcasting signal multiplexing unit configured to generate a layered-division-multiplexed broadcasting signal by combining the codec layer signals at different power levels, the broadcasting signal multiplexing unit comprising:
  a first Bit-Interleaved Coded Modulation (BICM) unit configured to generate a core layer signal including core layer symbols according to the base layer signal,
  a second BICM unit configured to generate an enhanced layer signal including enhanced layer symbols according to the enhancement layer signal,
  an injection level controller configured to generate a power-reduced enhanced layer signal by reducing a power of the enhanced layer signal,
  a combiner configured to generate a multiplexed signal using a sum of the core layer signal and the power-reduced enhanced layer signal,
  a power normalizer configured to reduce a power level of the multiplexed signal to a power level corresponding to the core layer signal,
  a time interleaver configured to generate a time-interleaved signal by performing time interleaving that is applied to both the core layer signal and the power-reduced enhanced layer signal, and
  a circuit to generate a broadcast signal frame corresponding to the layered-division-multiplexed broadcasting signal using the time-interleaved signal.

2. The apparatus of claim 1, wherein the codec layer signals are one-to-one mapped into layers of the broadcasting signal multiplexing unit.

3. The apparatus of claim 1, wherein the power normalizer corresponds to a normalizing factor, and reduces the power of the multiplexed signal by a level by which the power has been increased by the combiner.

4. The apparatus of claim 3, wherein:
 the injection level controller corresponds to a scaling factor;
 each of the normalizing factor and the scaling factor is a value that is larger than 0 and smaller than 1;
 the scaling factor decreases as a reduction in power corresponding to the injection level controller becomes larger; and
 the normalizing factor increases as a reduction in power corresponding to the injection level controller becomes larger.

5. The apparatus of claim 4, wherein the enhanced layer signal corresponds to enhanced layer data that is restored based on cancellation corresponding to restoration of core layer data corresponding to the core layer signal.

6. The apparatus of claim 5, wherein the combiner combines one or more extension layer signals, having lower power levels than the core layer signal and the power-reduced enhanced layer signal, with the core layer signal and the enhanced layer signal.

7. The apparatus of claim 6, wherein the codec layer signals further includes an additional enhancement layer signal, and wherein the additional enhancement layer signal corresponds to the extension layer signal.

8. The apparatus of claim 1, wherein the codec layer signals include a base layer signal and enhancement layer signals, and wherein the base layer signal corresponds to a core layer signal of the broadcasting signal multiplexing unit and the enhancement layer signals correspond to an enhanced layer signal of the broadcasting signal multiplexing unit.

9. The apparatus of claim 8, wherein the enhancement layer signals are multiplexed by using a multiplexer in the broadcasting signal multiplexing unit to be mapped into the enhanced layer signal.

10. A method of broadcasting scalable video contents, comprising:
 generating a plurality of codec layer signals by dividing codec media stream into a plurality of layers, the codec layer signals including a base layer signal and an enhancement layer signal of scalable video codec layer signals corresponding to a scalable video coding; and
 generating, using a first Bit-Interleaved Coded Modulation (BICM) unit, a core layer signal including core layer symbols according to the base layer signal;
 generating, using a second BICM unit, an enhanced layer signal including enhanced layer symbols according to the enhancement layer signal;
 generating a power-reduced enhanced layer signal by reducing a power of the enhanced layer signal,
 generating a layered-division-multiplexed broadcasting signal using a sum of the core layer signal and the power-reduced enhanced layer signal,
 wherein the generating the layered-division-multiplexed broadcasting signal comprises:
 generating a multiplexed signal using a sum of the core layer signal and the power-reduced enhanced layer signal;
 reducing power of the multiplexed signal to a power level corresponding to the core layer signal;
 generating a time-interleaved signal by performing time interleaving that is applied to both the core layer signal and the power-reduced enhanced layer signal; and
 generating a broadcast signal frame corresponding to the layered-division-multiplexed broadcasting signal using the time-interleaved signal.

11. The method of claim 10, wherein the codec layer signals are one-to-one mapped into layers of a layered-division-multiplexing corresponding to the layered-division-multiplexed broadcasting signal.

12. The method of claim 11, wherein the generating the multiplexed signal comprises combining one or more extension layer signals, having lower power levels than the core layer signal and the power-reduced enhanced layer signal, with the core layer signal and the enhanced layer signal.

13. The method of claim 12, wherein the codec layer signals further includes an additional enhancement layer signal, and wherein the additional enhancement layer signal corresponds to the extension layer signal.

14. The method of claim 10, wherein the codec layer signals include a base layer signal and enhancement layer signals, and wherein the base layer signal corresponds to a core layer signal of a layered-division-multiplexing and the enhancement layer signals correspond to an enhanced layer signal of the layered-division-multiplexing.

* * * * *